US009274250B2

(12) United States Patent
Pasken et al.

(10) Patent No.: US 9,274,250 B2
(45) Date of Patent: *Mar. 1, 2016

(54) APPARATUS AND METHOD FOR PROVIDING ENVIRONMENTAL PREDICTIVE INDICATORS TO EMERGENCY RESPONSE MANAGERS

(75) Inventors: Robert W. Pasken, St. Louis, MO (US); William Dannevik, St. Louis, MO (US)

(73) Assignee: Saint Louis University, St. Louis, MO (US)

( * ) Notice: Subject to any disclaimer, the term of this patent is extended or adjusted under 35 U.S.C. 154(b) by 771 days.

This patent is subject to a terminal disclaimer.

(21) Appl. No.: 13/484,252

(22) Filed: May 30, 2012

(65) Prior Publication Data

US 2012/0303278 A1 Nov. 29, 2012

Related U.S. Application Data

(63) Continuation-in-part of application No. 12/618,012, filed on Nov. 13, 2009, now Pat. No. 8,209,124.

(60) Provisional application No. 61/114,357, filed on Nov. 13, 2008.

(51) Int. Cl.
*G01W 1/00* (2006.01)
*G01W 1/10* (2006.01)

(52) U.S. Cl.
CPC .. *G01W 1/00* (2013.01); *G01W 1/10* (2013.01)

(58) Field of Classification Search
CPC ................................ G01W 1/00; G01W 1/10
USPC .......................................................... 702/3
See application file for complete search history.

(56) References Cited

U.S. PATENT DOCUMENTS

| 6,085,152 | A | 7/2000 | Doerfel |
|---|---|---|---|
| 6,208,938 | B1 | 3/2001 | Doerfel |
| 6,498,987 | B1 | 12/2002 | Kelly et al. |
| 6,683,609 | B1 | 1/2004 | Baron, Sr. et al. |
| 7,079,631 | B1 | 7/2006 | Kaufman |
| 7,096,121 | B2 | 8/2006 | Intriligator et al. |
| 7,103,480 | B2 | 9/2006 | Intriligator et al. |
| 7,181,345 | B2 | 2/2007 | Rosenfeld et al. |
| 7,275,089 | B1 | 9/2007 | Marshall et al. |

(Continued)

OTHER PUBLICATIONS

Goodwin, L.C. "Best Practices for Road Weather Management," Version 2.0., Miterek Systems, May 2003 [Retrieved on: Dec. 18, 2009]. Retrieved from the Internet: <URL: http://ops.fhwa.dot.gov/weather/best_practices/CaseStudiesFINALv2-RPT.pdf>.

(Continued)

*Primary Examiner* — Phuong Huynh
(74) *Attorney, Agent, or Firm* — Stinson Leonard Street LLP

(57) ABSTRACT

A method of predicting weather-exacerbated threats, said method comprising inputting localized weather measurement data into a weather threat prediction system; predicting future localized weather conditions based on said localized weather measurement data combined with modeling from National Weather Service Data; inputting natural environment and infrastructure data into said weather threat prediction system; correlating said infrastructure data with said predicted future localized weather conditions; and determining a threat level index over a region, a threat level indicating an area having a certain probabilistic likelihood of being harmed by said future weather conditions.

28 Claims, 18 Drawing Sheets

(56) References Cited

U.S. PATENT DOCUMENTS

| | | | |
|---|---|---|---|
| 7,365,674 | B2 | 4/2008 | Tillotson et al. |
| 7,528,765 | B1 | 5/2009 | Woodell et al. |
| 7,536,260 | B2 | 5/2009 | Hillman |
| 7,542,852 | B1 | 6/2009 | Rose et al. |
| 7,558,674 | B1 | 7/2009 | Neilley et al. |
| 7,653,708 | B2 | 1/2010 | Marshall et al. |
| 7,814,145 | B2 | 10/2010 | Lundy et al. |
| 7,847,708 | B1 | 12/2010 | Jones et al. |
| 7,953,825 | B2 | 5/2011 | Marshall et al. |
| 8,000,893 | B1 | 8/2011 | Cona et al. |
| 8,036,632 | B1 | 10/2011 | Cona et al. |
| 8,210,467 | B2 | 7/2012 | Hubbell et al. |
| 8,494,774 | B2 * | 7/2013 | Pasken et al. ............. 702/3 |
| 2003/0025627 | A1 | 2/2003 | Wilson |
| 2004/0015336 | A1 | 1/2004 | Kulesz et al. |
| 2004/0230377 | A1 * | 11/2004 | Ghosh et al. ............. 702/3 |
| 2005/0136983 | A1 | 6/2005 | Agapi et al. |
| 2005/0154531 | A1 | 7/2005 | Kelly et al. |
| 2005/0197903 | A1 | 9/2005 | Hoffman et al. |
| 2007/0162328 | A1 | 7/2007 | Reich |
| 2007/0244644 | A1 | 10/2007 | Tanahashi |
| 2007/0276598 | A1 | 11/2007 | Tillotson |
| 2008/0027885 | A1 | 1/2008 | van Putten et al. |
| 2008/0076450 | A1 | 3/2008 | Nanda et al. |
| 2008/0087070 | A1 | 4/2008 | van Putten et al. |
| 2008/0097701 | A1 | 4/2008 | Zawadzki |
| 2008/0154655 | A1 | 6/2008 | Hartmann et al. |
| 2008/0293387 | A1 | 11/2008 | Conn et al. |
| 2009/0076665 | A1 | 3/2009 | Hoisington et al. |
| 2009/0177482 | A1 | 7/2009 | Granruth et al. |
| 2010/0046493 | A1 | 2/2010 | Parker |
| 2010/0131202 | A1 | 5/2010 | Dannevik et al. |
| 2010/0212421 | A1 | 8/2010 | Young et al. |
| 2010/0274838 | A1 | 10/2010 | Zemer |
| 2011/0004511 | A1 | 1/2011 | Reich |
| 2012/0303278 | A1 | 11/2012 | Dannevik et al. |

OTHER PUBLICATIONS

Shaw et al, "Implementation of the WRF Model for the Dubai International Airport Aviation Weather Decision Support System," 13th Conference on Aviation, Range, and Aerospace Meteorology New Orleans, American Meteeorology Society, Jan. 20-24, 2008 [Retrieved on: Dec. 18, 2009]. Retrieved from the Internet: <URL: http://ams.confex.com/ams/88Annual/techprogram/paper_133147.htm>.

Stouffer et al, Guide to Supervisory Control and Data Acquisition (SCADA) and Industrial Control Systems Security Recommendations of the National Institute of Standards and Technology, Sep. 2006, pp. 1-F-6, Special Publication 800-82, National Institute of Standards and Technology Technology Administration U.S. Department of Commerce.

Snook, et al., Local-Domain Mesoscale Analysis and Forecast Model Support for the 1996 Centennial Olympic Games; Weather and Forecasting, vol. 13, pp. 138-150, Mar. 1998.

Wang, et al., ARW Version 2 Modeling System User's Guide Chapter 3, Weather Research & Forecasting, Jan. 2006.

Dudhia, A Nonhydrostatic Version of the Penn State-NCAR Mesoscale Model: Validation Tests and Simulation of an Atlantic Cyclone and Cold Front, American Meteorological Society, May 1993.

Skamarock, et al., A Description of the Advanced Research WRF Version 3, Mesoscale and Microscale Meteorology Division, National Center for Atmospheric Research, Jun. 2008.

Gutman, et al., Rapid Retrieval and Assimilation of Ground Based GPS-Met Observations at the NOAA Forecast Systems Laboratory: Impact on Weather Forecasts, 2003.

Henmi, et al, Development of a Weather Running Estimate-Nowcast Capability for the U.S. Army IMETS, Army Research Laboratory, Sep. 2005.

Higgins, et al., Advanced Weather Prediction Technologies: Two-Way Interactive Sensor Web & Modeling System, Phase II Vision Architecture Study, A report prepared for NASA's Earth Science Technology Office, Nov. 1, 2003.

Steiner, et al., "Inversion, error analysis, and validation of GPS/MET occultation data", Annales Geophysicase, vol. 17, Issue 1, pp. 122-128, Dec. 1998. Retrieved on [Jul. 25, 2013]. Retrieved from the internet: <URL: http://hal.archives-ouvertes.fr/docs/00/31/65/10/PDF/angeo-17-122-1999.pdf> entire document.

Anderson, et al., Mesonet Programs—Needs and Best Practices, 10th EMS Annual Meeting, 10th European Conference on Applications of Meteorology (ECAM), Sep. 13-17, 2010, Zurich, Switzerland.

Dannevik, et al., Local Area Forcing of Urban-to Regional-Scale Atmospheric Dispersion: Exchangin Fluxes in a Multiscale Environment, US Dept of Energy, Feb. 13, 2003.

Earth Networks, Taking the Pulse of the Planet, Nov. 13, 2012.

National Oceanic and Atmospheric Administration, U.S. Dept of Commerce, C. Technology Transfer, ESRL Physical Sciences Laboratory Review, Mar. 9-12, 2010.

Novakovskaia, et al.,Earth Networks, New WeatherFarm Forecasting a First in Canada, Jan. 26, 2011.

User's Guide for Advanced Research WRF (ARW) Modeling System Version 2.2, Weather Research & Forecasting, Mesoscale & Microscale Meteorology Division, National Center for Atmospheric Research, Dec. 2006.

ARW, Version 2 Modeling System User's Guide, Weather Research & Forecasting, Mesoscale & Microscale Meteorology Division, National Center for Atmospheric Research, Jan. 2006.

McCaslin, et al, WRFSI User's Guide 2.1, Users Guide to the Graphical User Interface to Prepare the Standard . Initialization for WRF Version 2.1, NOAA Research—Forecast Systems Laboratory, Boulder Colorado, Sep. 2005.

Weatherbug, WeatherBug, BT, UTV Create Weather Network for NIE, www.wireless-backhaul.tmcnet.com/news/2009/10/29/4452171.htm, Oct. 29, 2009.

Earth Networks, Weatherbug, www.earthnetworks.com/WeatherBug.aspx, Nov. 2010.

Weatherbug, Programs developed by WeatherBug (AWS Convergence Technologies, Inc.), http://weatherbug-aws-convergence-technologies.software.informer.com, 2011.

Weatherbug, Your Weather Just Got Better, About Us, http://weather.weatherbug.com/aws-corporate/about.asp, Jun. 2010.

IBM Research, Deep Thunder Precision Forecasting for Weather-Sensitive Business Operations, Nov. 14, 2006.

Spiegler, Eye of the Storm, Introducing the pinpoint-precise local microcasts of IBM's Deep Thunder, www.wired.com, Issue 7.02, Feb. 1999.

Trabish, IBM Wants to Make Wind Farms and Solar Power Plants Smarter, www.greentechmedia.com, Dec. 8, 2010.

National Geographic, Weather, Forecasting the Chaos of Weather, http://ngm.nationalgeographic.com/ngm/0506/feature5/multimedia.html, 2008.

Polaris Venture Partners, Polaris-Backed, AWS Convergence Technologies, www.polarisventures.com/ Portfolio, 2004.

Earth Networks, Press Release, WeatherBug Joins Forces with Northern Ireland Electricity, BT and UTV, http://earthnetworks.com/MediaCenter/PressRelease/tabid/118/newsid513/61/Default.aspx, 2011.

IBM, Electric Utility gets ahead of the weather with new forecasting models, Sep. 2010.

Steeneveld, et al., Exploring the Possible Role of Small-Scale Terrain Drag on Stable Boundary Layers over Land, Journal of Applied Meteorology and Climatology, p. 2518, vol. 47, No. 10, Oct. 2008.

Schmit, et al, The GOES-R Advanced Baseline Imager and Continuation of Current Sounder Products, Journal of Applied Meteorology and Climatology, p. 2696, vol. 47, No. 10, Oct. 2008.

Hamdi, et al., Inclusion of a Drag Approach in the Town Energy Balance (TEB) Scheme: Offline ID Evaluation in a Street Canyon, Journal of Applied Meteorology and Climatology, p. 2627, vol. 47, No. 10, Oct. 2008.

Ensor, et al., Statistical Characteristics of Daily Precipitation: Comparisons of Gridded and Point Datasets, Journal of Applied Meteorology and Climatology, p. 2468, vol. 47, No. 9, Sep. 2008.

(56) References Cited

OTHER PUBLICATIONS

Fisher, et al, Comparison of Synthetic Aperture Radar-Derived Wind Speeds with Buoy Wind Speeds along the Mountainous Alaskan Coast, Journal of Applied Meteorology and Climatology, p. 1365, vol. 47, No. 5, May 2008.

Saxen, et al., The Operational Mesogamma-Scale Analysis and Forecast System of the U.S. Army Test and Evaluation Command. Part IV: The White Sands Missile Range Auto-Nowcast System, Journal of Applied Meteorology and Climatology, p. 1123, vol. 47, No. 4, Apr. 2008.

Basu, et al., Dynamic LES Modeling of a Diurnal Cycle, Journal of Applied Meteorology and Climatology, p. 1156, vol. 47, No. 4, Apr. 2008.

Weverburg, et al., Modeling the Contribution of the Brussels Heat Island to a Long Temperature Time Series, Journal of Applied Meteorology and Climatology, p. 976, vol. 47, No. 4, Apr. 2008.

Lundquist, et al., Interaction of Nocturnal Low-Level Jets with Urban Geometries as Seen in Joint Urban 2003 Data, Journal of Applied Meteorology and Climatology, p. 44 vol. 47, No. 1, Jan. 2008.

Klipp, Wind Direction Dependence of Atmospheric Boundary Layer Turbulence Parameters in the Urban Roughness Sublayer, Journal of Applied Meteorology and Climatology, p. 2086 vol. 46, No. 12, Dec. 2007.

Wang, et al., Nocturnal Low-Level-Jet-Dominated Atmospheric Boundary Layer Observed by a Doppler Lidar over Oklahoma City during JU2003, Journal of Applied Meteorology and Climatology, p. 2098 vol. 46, No. 12, Dec. 2007.

Frech, et al., High-Resolution Weather Database for the Terminal Area of Frankfurt Airport, Journal of Applied Meteorology and Climatology, p. 1913 vol. 46, No. 11, Nov. 2007.

Garand, et al., Interchannel Error Correlation Associated with AIRS Radiance Observations: Inference and Impact in Data Assimilation, Journal of Applied Meteorology and Climatology, p. 714 vol. 46, No. 6, Jun. 2007.

Zhang, et al., An Empirical Orthogonal Function Iteration Approach for Obtaining Homogeneous Radiative Fluxes from Satellite Observations, Journal of Applied Meteorology and Climatology, p. 435 vol. 46, No. 4, Apr. 2007.

Oku, et al., Estimation of Land Surface Heat Fluxes over the Tibetan Plateau Using GMS Data, Journal of Applied Meteorology and Climatology, p. 183 vol. 46, No. 2, Feb. 2007.

Jianping, et al, The Effects of Model Resolution on the Simulation of Regional Climate Extreme Events, Acta Meteorlogica Sinica, p. 129 vol. 21, No. 2, 2007.

Wenhua, et al., Validation of the Atmospheric Infrared Sounder Retrieval Products over China and Their Application in Numerical Model, Acta Meteorlogica Sinica, p. 141 vol. 21, No. 2, 2007.

DuPont, et al., Parameterization of the Urban Energy Budget with the Submesoscale Soil Model, Journal of Applied Meteorology and Climatology, p. 1744 vol. 45, No. 12, Dec. 2006.

Bedka, et al., Application of Satellite-Derived Atmospheric Motion Vectors for Estimating Mesoscale Flows, Journal of Applied Meteorology and Climatology, p. 1761 vol. 44, No. 11, Nov. 2005.

Miller, et al., Satellite-Based Imagery Techniques for Daytime Cloud/Snow Delineation from MODIS, Journal of Applied Meteorology and Climatology, p. 987 vol. 44, No. 7, Jul. 2005.

Shaw, B., et al., Implementation of the WRF Model for the Dubai International Airport Aviation Weather Decision Support System, American Meteorological Society, 2008, pp. 1-11.

* cited by examiner

Utility/Government Component

EAS Component

A representative sensor suite

EAS Process overview

National Weather Service date ingest process

Mesonet data ingest process

Main flow chart for QC process

Main flow chart for QC process (level 1)

Main flow chart for QC process (level 2)

Main flow chart for QC process (level 3)

Mesonet Graphics pre-processor

Forecast model flow chart

Three Dimensional rendering of Forecast Data

APPARATUS AND METHOD FOR PROVIDING ENVIRONMENTAL PREDICTIVE INDICATORS TO EMERGENCY RESPONSE MANAGERS

CROSS-REFERENCE TO RELATED APPLICATION

This application is a continuation-in-part application of U.S. Non-Provisional application Ser. No. 12/618,012, filed Nov. 13, 2009, entitled APPARATUS AND METHOD FOR PROVIDING ENVIRONMENTAL PREDICTIVE INDICATORS TO EMERGENCY RESPONSE MANAGER, which claims the benefit of and priority to U.S. Provisional Patent Application Ser. No. 61/114,357, filed Nov. 13, 2008, entitled SYSTEM AND METHOD FOR PROVIDING ENVIRONMENTAL PREDICTIVE INDICATORS TO EMERGENCY RESPONSE MANAGERS, which aforesaid applications are hereby incorporated by reference in their entirety to the extent permitted by law.

BACKGROUND OF INVENTION

1. Field of Invention

The present invention generally relates to systems and methods for providing decision support predictive indicators that will create real-time probability impact information for decision makers and logistical managers when allocating resources and man power responsive to infrastructure repair, emergency events and/or natural resource issues, and more particularly to the impact of weather events on infrastructure, natural resources and/or environmental conditions.

2. Background of Art

Emergency Response Management are often the task of government agencies, utilities and businesses who are charged with responding in many crisis situations. The Federal Government utilizes the Federal Emergency Management Agency (FEMA) to respond to major catastrophes, such as hurricanes, earthquakes, nuclear accidents, tornadoes, wildfires and the like. On a more local level, utility companies tasked with providing essential services to consumers (power, water, gas, sewage) have created internal Emergency Management departments with the goal of responding quickly to outages often caused by weather events. In private industry, businesses which handle chemicals and other possibly harmful materials generally have created similar internal Emergency Management departments which deal with chemical spills and leaks and other environmental hazards.

However, often times such emergencies are created and/or exacerbated by weather conditions. Certainly, hurricanes and tornadoes are, in and of themselves, weather conditions which may cause tremendous destruction. Wildfires, chemicals released by leaks or spills, and radioactive waste released in nuclear accidents are all subject to be worsened by wind. Downed power lines are caused by high winds and flying/falling debris, such as tree limbs, or by ice storms. Floods are generally caused by high rainfall amounts. Thus, the weather conditions during these accidents and disasters are responsible for much of the associated danger and service outages.

Weather prediction should be an integral part of Emergency Response Management—knowing the present and future weather conditions can help Emergency Response Management to send resources not only to locations that are in need. However, current predictive techniques for weather patterns are generally performed on a national, or multi-state regional scale. This large scale weather prediction is largely insufficient for predicting the location of specific weather conditions with enough precision to ultimately assist Emergency Response Management personnel. Prior art weather monitoring stations are generally spaced 100-200 miles apart due to their expense and complexity. The wide spacing and skyward focus of these monitoring stations largely prevents them from monitoring ground conditions, and provides weather data accurate enough only to predict general weather patterns.

Many kinds of threats that the utility industry, natural resource managers, emergency responders and government agencies face are created and/or exacerbated by weather conditions. In particular threats created by high winds, icing, and lightning strikes are among the most difficult to predict and assess, because of their highly time-dependent geospatial distribution. The threat posed by the dispersion of chemicals released by leaks or spills, and radioactive waste released in nuclear accidents is also difficult to predict and assess, because of the highly time and space dependent weather conditions. Floods are generally caused by high rainfall amounts. Thus, the highly variable spatial and temporal variability of weather conditions play a crucial role in how the utility industry and government agencies respond.

The utility industry knows that weather plays in the long-term management of resources and has used long-term weather forecasts to plan the distribution of resources. However, the use of high spatial and temporal resolution short-term forecasts pin-pointed at specific regions has not been explored by either the utility industry or the government agencies charged with responding to natural or man-made disasters. Current weather numerical weather forecasts are generally performed on a national, or multi-state regional scale. This large-scale weather prediction is largely insufficient for predicting with enough precision the location and severity of weather conditions to provide actionable intelligence to the utility industry or emergency responders. Again, as noted above, prior art weather monitoring stations are generally spaced 100-200 miles apart due to their expense and complexity. The wide spacing of these monitoring stations largely prevents them from providing weather data at the local or neighborhood level, which is crucial for the utility industry and emergency responders.

The national or multi-state regional forecasts are insufficient for more localized weather prediction needed during an emergency. Detailed information about the character of the wind field over a neighborhood could be the difference between whether a school can be evacuated in time to avoid a poisonous chemical cloud, or whether it would be better for students to remain inside. Further, a difference of just a few degrees in temperature or a few miles per hour of wind speed over a distance of less than a mile could be the difference between a few power lines being downed versus hundreds of thousands of people in a heavily populated area being without power.

Accordingly, embodiments of the present invention provide for a system and method that monitors environmental conditions at locations spaced closer together than prior art monitoring stations. Thus, the greater number of monitoring stations in a smaller area provide for a higher resolution of weather data, allowing for a more precise and accurate forecast of conditions including weather data closer to the ground. When such weather data is correlated with relatively static infrastructure data, the present invention allows for a threat level index to be created which indicates the localities which are most likely to be threatened by the exacerbation of an event by the weather. Emergency Response Management may then use the threat level index to determine where and when to martial personnel.

BRIEF SUMMARY OF THE INVENTION

The present invention generally relates to systems and methods for providing decision support predictive indicators that will create real-time, detailed geographical distributions of the probability of the impact of weather events on infrastructure, natural resources and/or environmental conditions and more particularly to the impact of storm damage due to severe weather events (high winds, icing, and lightning strikes) to infrastructure, for example the utility industry infrastructure, or other infrastructure. The present invention also relates to systems and methods for prediction and assessment of air-borne pollen, agricultural pathogens, and hazardous materials for a variety of public and private agencies.

One or more of the embodiments of the present invention provide for a system and method for correlating localized weather predictions with relatively static infrastructure data. In a preferred embodiment, a network of monitoring stations input weather data into the Earth and Atmospheric Science (EAS) system. The network of monitoring stations can generally be referred to as a local Mesonet. These monitoring stations are spaced closer together than the 100-200 mile spacing of current monitoring stations, and are adapted to capture weather data more often than current monitoring stations, allowing for finer resolution of weather data. The monitoring stations or sensor suites can be remotely located and stand-alone systems with wireless transmission capability. The monitoring stations of the local Mesonet are also strategically placed based on certain parameters to optimize the efficacy of the stations and their respective data. The weather prediction system then utilizes this higher resolution weather data to predict the future weather conditions for an area, including future near-ground level weather. The processed data from the Mesonet is combined with weather prediction Mesoscale meteorological models operating on National Weather Service Data to predict the short-term weather at the neighborhood scale. Given a high spatial and temporal resolution meteorological forecast is made, the system combines the weather predictions with infrastructure data and/or natural environment data of the area to create a threat level index and a graphical map presentation of any threats. As will be understood by one skilled in the art, certain weather conditions combined with certain types of infrastructure can create emergency conditions. The threat level index is a probabilistic tool that rates areas in which certain infrastructure is likely to encounter certain, possibly hazardous conditions, and/or outages, which can result in a high probability of danger and/or service outage periods.

One embodiment of the present invention is to leverage on a Supervisory Control and Data Acquisition (SCADA) system of an electrical utility company. Many large electrical utility companies utilize a SCADA system to monitor and relay information related line status and other infrastructure status. The SCADA system utilized by electrical utilities usually utilize a series of substations that are distributed throughout the electrical utilities line and infrastructure system. The substations receive communications from various monitoring devices that are actively monitoring line status and the status of the other infrastructure. The substations receive the information transmitted to it wirelessly or by hardwire from the various monitoring devices. The substation can package the data received and transmit the status to a central server via an ethernet connection or other wide area network connection. The central server can process the information as well as transmit the information to other systems. This SCADA system can utilize the power lines to transmit data information or other means. In one embodiment of the present invention the SCADA system utilized by an electrical utility can be leveraged to transmit data from remote weather monitoring stations from any location were there are existing power lines. Utilizing SCADA will provide a comprehensive widespread network at low cost. The SCADA system can be equipped with electronic conversion devices that can wirelessly or via hardwire receive data transmission from remote weather monitoring stations and convert the data readings to a format and protocol that the SCADA system can handle and transmit. This embodiment is using the SCADA network available on the electrical power system in a way that was not intended but is quite effective in leveraging the SCADA electrical utility infrastructure to create a Local Mesonet network of weather monitoring stations that is comprehensive providing a high degree of spatial and temporal resolution that would be much more difficult and less cost effective to achieve without SCADA.

Therefore, one embodiment of the present invention can be a system for predicting weather-related threats, comprising an electrical utility infrastructure having a SCADA network adapted for monitoring and reporting infrastructure status including a plurality of substations dispersed throughout a region serviced by the electrical utility infrastructure, where said substations including a transceiver module operable to receive and transmit infrastructure status transmissions, and where said SCADA network includes a central server communicably linked to said plurality of substations and adapted to receive and process infrastructure status transmissions transmitted from the plurality of substations. The embodiment can further include a local Mesonet including a plurality of weather monitoring stations dispersed throughout the region serviced by the electrical utility infrastructure, where each weather monitoring station including weather condition sensors and transmitters adapted to transmit to the SCADA network data representative of the weather conditions sensed by the weather condition sensors. The central server can be communicably linked to a wide area network and adapted to transmit said data representative of the weather conditions over said wide area network. An electronic converter module integral with the SCADA network can be operable to receive and convert the data representative of the weather conditions and transmitted by the plurality of weather monitoring stations into a format and protocol that can be processed and transmitted by the SCADA network. An EAS computing system communicably linked to said wide area network and adapted to receive data representative of the weather conditions as transmitted by the central server can be adapted to present said data representative of the weather conditions to a user interface for user viewing.

In general SCADA refers to an industrial control system and is usually a computer based system for monitoring and controlling a process or equipment or infrastructure. The process can be industrial, infrastructure or facility based. As discussed above infrastructure processes may be public or private, and include water treatment and distribution, wastewater collection and treatment, oil and gas pipelines, the specific example above—electrical power transmission and distribution, and large communication systems. A SCADA System can usually include the following subsystems: A Human-Machine Interface or HMI is the apparatus which presents process data to a human operator, and through this the human operator monitors and controls the process; A supervisory (computer) system, gathering (acquiring) data on the process and sending commands (control) to the process; Remote Terminal Units (RTUs) connecting to sensors in the process, converting sensor signals to digital data and sending digital data to the supervisory system.

The term SCADA usually refers to centralized systems which monitor and control entire sites, or complexes of systems spread out over large areas (anything between an industrial plant and a country). Most control actions are performed automatically by remote terminal units ("RTUs") or by programmable logic controllers ("PLCs"). Host control functions are usually restricted to basic overriding or supervisory level intervention. For example, a PLC may control the flow of cooling water through part of an industrial process, but the SCADA system may allow operators to change the set points for the flow, and enable alarm conditions, such as loss of flow and high temperature, to be displayed and recorded. The feedback control loop passes through the RTU or PLC, while the SCADA system monitors the overall performance of the loop.

Data acquisition begins at the RTU or PLC level and includes meter readings and equipment status reports that are communicated to SCADA as required. Data is then compiled and formatted in such a way that a control room operator using the HMI can make supervisory decisions to adjust or override normal RTU (PLC) controls. Data may also be fed to a Historian, often built on a commodity Database Management System, to allow trending and other analytical auditing. SCADA systems typically implement a distributed database, commonly referred to as a tag database, which contains data elements called tags or points. A point represents a single input or output value monitored or controlled by the system. Points can be either "hard" or "soft". A hard point represents an actual input or output within the system, while a soft point results from logic and math operations applied to other points. (Most implementations conceptually remove the distinction by making every property a "soft" point expression, which may, in the simplest case, equal a single hard point.) Points are normally stored as value-timestamp pairs: a value, and the timestamp when it was recorded or calculated. A series of value-timestamp pairs gives the history of that point. It's also common to store additional metadata with tags, such as the path to a field device or PLC register, design time comments, and alarm information.

A Human-Machine Interface or HMI is the apparatus which presents process data to a human operator, and through which the human operator controls the process. An HMI is usually linked to the SCADA system's databases and software programs, to provide trending, diagnostic data, and management information such as scheduled maintenance procedures, logistic information, detailed schematics for a particular sensor or machine, and expert-system troubleshooting guides. SCADA solutions often have Distributed Control System (DCS) components. Use of "smart" RTUs or PLCs, which are capable of autonomously executing simple logic processes without involving the master computer, is increasing. A functional block programming language, IEC 61131-3, is frequently used to create programs which run on these RTUs and PLCs. Unlike a procedural language such as the C programming language or FORTRAN, IEC 61131-3 has minimal training requirements by virtue of resembling historic physical control arrays. This allows SCADA system engineers to perform both the design and implementation of a program to be executed on an RTU or PLC.

For example, in one embodiment of the present invention, the predictive indicator system provides a threat level index for a weather event to a municipal electric utility company. Infrastructure data including the location of above-ground power lines and trees can be infrastructure and natural environmental inputs into the system. The system can then analyze the likelihood that winds over a certain speed will occur and/or that icing will occur in an area where both above-ground power lines and trees are present. Where it is determined that all three of these factors are likely to overlap, a high threat level is assigned. Thus, an Emergency Management Center of an electric utility company can be notified and therefore, be able to decide where and when to martial manpower and how much manpower to allocate before the crisis or outage arises.

As another example, in another embodiment, the predictive indicator system provides a threat level index for a weather event to a sewage department. In such a situation, the static infrastructure data may include data regarding the location and capacity of waterways and drains, and possibly the topology of the area. The system would be able to predict the location of heaviest rainfall in a city and the direction the rainwater would travel once on the ground, and determine whether the sewage department would then need to reroute certain waterways to attempt to load-level the rainfall volume across a larger portion of the city. Thus, Emergency Response Management would be able to decide in advance where and when to reroute such waterways.

As a third example, in another embodiment, the predictive indicator system provides a threat level index for an environmental hazard, such as a chemical spill, or for a major catastrophe, such as a nuclear accident. In such a situation in which a harmful agent is released into the air, the location and amount of the release would be input into the system, along with infrastructure data such as the location of schools and heavily populated areas. When the location and volume of the release is correlated with the wind direction and speed (and possibly with rain movement and humidity index in the case of a water soluble release), a threat level can be assigned to those areas with the highest populations and/or highest chance of encountering the release cloud. Further, knowing precisely what the speed of the wind will be with fine resolution allows for the calculation of the probable amount of time it will take for the release cloud to encounter infrastructure. Thus, a FEMA and/or a business's Emergency Response team would be able to decide where and whether to evacuate, and where to send the evacuees.

As a fourth example, in another embodiment, the predictive indicator system provides a threat level index for a fire created by a major catastrophe, such as a fire caused in the wake of an earthquake or other natural disaster, or possibly a wildfire. In such a situation in which fire is spreading, the location and size of the fire would be input into the system, along with infrastructure data such as the location of other flammable material, chemical holding facilities, heavily populated areas, etc. When the location and size of the fire is correlated with the wind direction and speed (and possibly with humidity and rainfall), a threat level can be assigned to those areas with the highest populations and/or highest chance of the fire spreading. An examination of previous localized rainfall and topography can also be utilized. Further, knowing precisely what the speed of the wind will be with fine resolution allows for the calculation of the probable amount of time it will take for the fire to encounter infrastructure. Additionally, wildfires caused by lightning could be predicted by correlating very dry areas with the specific areas predicted to encounter heavy lightning. Thus, a FEMA will be able to decide where and whether to evacuate, and to where to send the evacuees.

The EAS process includes a network of weather stations deployed in key locations throughout the region that measure various conditions, including temperature, humidity, atmospheric pressure, wind speed and rainfall rates. These stations can be solar-powered and can continuously feed information to a central site where the data is quality-controlled. The quality-controlled data is then placed in a database where it can be accessed by other tools with the EAS process to create graphics of the existing conditions and for use in numerical weather prediction models. The Mesonet data and the high spatial and temporal resolution meteorological forecast is not the only method utilized to understand and create an assessment of the current and predicted weather, and to asses the risk that the weather posses to the utility industry and to the government agencies responsible for emergency management.

To properly assess the current and predicted weather and to asses the risk, the temporal and spatial resolution is maximized and the current and predicted meteorological fields are used to derive and display parameters such as divergence, vorticity, moisture advection, velocity shear and deformation, and gradient wind strength. Using the EAS process developed tools a clear and decisive assessment of the current and predicted weather and the risk this weather poses can be clearly understood and delineated. The mesonet stations are also strategically placed based on regional characteristics, known geophysical trends or conditions, maximizing spatial and temporal resolution and the relevant application. The EAS process develops a characteristic scheme that utilizes regional information including topography, climatology and infrastructure, high spatial and temporal resolution information and application. The meteorological fields described and how they would be combined should be apparent to one, skilled in the art area as they review the entirety of this specification.

Using the analysis created by the EAS process, an indication of those areas most at risk for losing power or other threat is produced. The system rates the probability of power loss or other threat in individual local areas on a scale from 1 to 100. A state of the art weather prediction model (WRF) is tuned to fit the local conditions by choosing, from the many possible choices of parameterization schemes, those parameterizations schemes that, when combined, provide the best possible forecast. The present invention determines which combinations of parameterization schemes that produce the highest spatial and temporal correlation factors for the application, spatial and temporal resolution and region between the forecasted weather conditions and observed weather conditions.

The larger scale numerical weather forecasts from the National Weather Service are combined with the quality controlled high spatial and temporal resolution data from the Mesonet using the model initialization tools produces a significantly improved WRF model initialization that creates a forecast with the highest spatial and temporal correlation factors between observed and forecasted weather data. The high spatial and temporal resolution weather forecast is combined with the location of overhead power lines, and tree density and other natural obstructions or terrain and type to create an index that provides the power industry or other relevant user with an indication of the precise location of threatened areas, when these areas will be affected and for how long. This high spatial and temporal index allows the utility industry to preposition equipment and crews to minimize the disruption to the infrastructure. The advanced warning also allows the utility industry and other entities requiring emergency response management to maximize the allocation of personal. When applying the EAS system to other applications other infrastructure, topography and natural environment features may be used.

The EAS Process creates accurate, location-specific weather hours ahead of storms, thus users will be better prepared for severe weather. This system is tied to information on trees (and other natural environmental conditions such as for example—terrain and elevation) and power lines (and other infrastructure, such as for example roads or man-made obstructions and structures that can impact the readings of sensor stations or impact of local weather), it also enables users to more readily—and quickly—identify areas that have been hardest hit by outages or damage. Data such as population density, housing density, critical facilities, pedestrian and vehicle traffic can be utilized. This is a more efficient use of financial and human resources and will significantly improve the company's response and restoration time for customers, improving system reliability.

The system's usefulness extends beyond pinpointed weather forecasting and the utility industry, the utility industry is utilized throughout the specification as an illustrative example, but in no way limits the scope of the present invention. For example, because the system constantly monitors wind conditions, the system would have the ability to predict the path of a cloud of hazardous material in the event of an industrial accident or bioterrorism attack.

BRIEF DESCRIPTION OF THE DRAWING

For a better understanding of the present invention, reference may be made to the accompanying drawings in which.

DETAILED DESCRIPTION OF THE INVENTION

Figure 1:
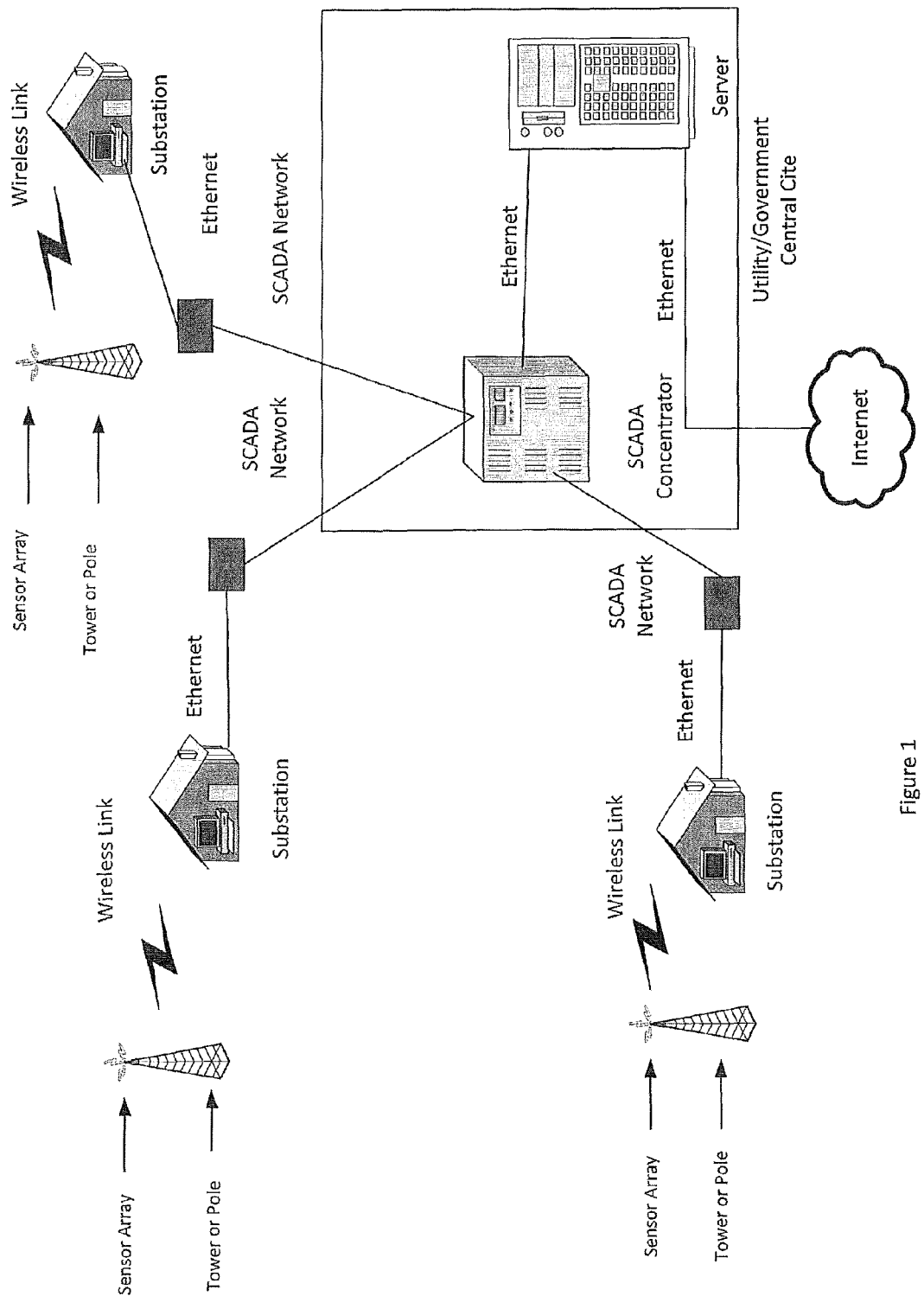
FIG. 1 is an illustration of EAS network environment.

According to the embodiment(s) of the present invention, various views are illustrated in FIGS. 1-9 and like reference numerals are being used consistently throughout to refer to like and corresponding parts of the invention for all of the various views and figures of the drawing.

Data from all over the entire globe is typically utilized in order to make a forecast. Meteorological forecasting is performed in a global fashion. Global forecast data is available to forecasters around the world. There is a very large global model referred to as GFS, which stands for the Global Forecast System. Unfortunately, it is difficult to make that model work on a localized level in order to predict weather events accurately because the resolution of the model is very coarse—lacks sufficient resolution. Further, such a forecast system lacks the ability to factor in local parameters that may affect the accuracy of a prediction and further predict the impact that the weather event may cause. Depending on the season of the year the resolution can vary and can be somewhere between 40 and 50 kilometer resolution. This resolution is inadequate for use in a highly localized forecasting model. The important features that are of interest are missed. That is a common problem with all groups that make use of these weather forecasts. The resolution from this global forecast model is too coarse.

In order to solve the problem, individual groups have attempted methods of nesting one model with another. A larger global forecast system model is generated and then nested with a model generated across the continental United States, and further the National Weather Service runs yet another model that's called the North American Meso Model, or sometimes referred to as NAMM. That's a finer resolution model and it's updated more often. However this level of nesting is still not good enough for the kinds of forecasting that is addressed by the present invention because the resolution is still too coarse and can not be manipulated or extrapolated as needed and still does not factor in local parameters that may affect the accuracy of a prediction and further predict the impact that the weather event may cause. However, as the invention is further described herein, it will become apparent that increased resolution by itself particularly at this level also is not sufficient. However, the resolution resulting from nesting to this level is fine enough that it can be utilized by the present invention if the proper initialization and pre-processing is performed by the present invention and combined with the local Mesonet data of the present invention to create the present invention's WRF model, which stands for Weather Research Forecasting model. The finer resolution of the WRF model can better controlled, manipulated, parameterized and modified. By utilizing the present invention, the fineness of the resolution both in space and time can be selected by the user.

Although more information is needed than either of these two models nested can provide me, the present invention can utilize the information to create what can be referred to as boundary conditions. The boundary conditions can be modeled as a cube or a matrix of cubes, which define boundaries over which the present invention can be utilized to perform forecasting. The cube or boundary can be considered a geographic region and the nested data as described can be utilized to determine what the conditions are along the edges of this model.

Conditions defined along the edges create a boundary for my model. The boundary includes a lower boundary or something at the ground as well as something along each of the side edges. Some of the information can be properly extracted by the EAS system from the medium resolution model. Additional information can be captured from the EAS systems local mesonet that has been strategically installed and implemented. The EAS system can also capture geographic information from a geographic data base. And this geographic data base can include topography, soil type, soil moisture, soil temperature and other relevant climatological geographic information from a climatological model. Further, land use information can be extracted such as for example—it's a farm, it's a highway, it's a baseball stadium. Topography, soil type, moisture, temperature, land use information and other like information can be extracted in order to describe the lower boundary of the model, or if you will, domain. The cube or other practical geometry that is utilized by the EAS system can be referred to as the model domain. In the case of a cube, the model has six sides to the domain. Four edge domains can be extracted from the coarser or medium scale forecast. The bottom can be extracted from the above mentioned geographic database information, which was developed as part of the WRF model. It has a resolution of about approximately 30 arc-seconds which is what. This allows for very fine transitions in the environment to be discerned. The topography data is available from databases such as the database generated by the National Defense Mapping Agency.

The EAS system can be utilized to determine the pieces of that geographic database that is need for a particular model domain. The Geogrid routine of the EAS computing system can be utilized to take the definition of the domain or model domain. The Geogrid can access the database and extracts out of it the information that is needed to describe the bottom portion of the domain referred to as the lower boundary condition. The domain can be changed and the Geogrid can adapt the domain accordingly. This domain can be changed and defined based on need. It is this ability to adapt the domain and the prediction need that drives the location of the stations. The need can be time and spatial dependent, in other words—on one hand how far in advance is the forecast needed or the forecast time window, and this can be general referred to as the temporal resolution. There's a second portion of the resolution that has to do with spacing or spatial resolution. This again is driven by need. For example the forecasting need for a large municipal electrical utility that is concerned about the impact inclement weather may have on their infrastructure, the spatial resolution needed can be about approximately 9 kilometers. The temporal resolution in this example can be about approximately 15 to 20 minutes. So as the need changes the Geogrid can be utilized to modify the domain. So the parameters that are utilized for the Geogrid come from the definition of the need. The Geogrid can be a computer implement function or routine.

An additional piece in the EAS system is a program or function referred to a Ungrib. Unigrib takes the large coarse domain and decodes it. National Weather Service, for example, broadcasts this weather data information for access. The data is usually shipped as a large data file that is compressed and can be generally referred to as a GRIB file, which stands for a gridded binary file. The UnGRIB function decompresses the file. Then, Metgrid takes the lower boundary condition, and it takes the lateral boundary conditions generated by UnGRIB and imports the information into the defined domain. Now all of the boundary conditions that surround the defined domain have been modeled. The EAS system now has an accurate description of the initial conditions and the boundary conditions for the model domain.

The MetGRID, GeoGRID, and UnGRIB functions can be generally referred to as the Mesonet pre-processor function. Another component of the Mesonet pre-processor function is the quality control function that operates on the Mesonet data. The Metgrid processor takes all of that information, and transforms the data into the conditions that are necessary for the EAS system to run my model. An advantage that is provided with the EAS system is the information that goes into Metgrid function is processed by the quality control function which performs a quality control function on the mesonet data. The EAS system, also generally referred to as the Quantum Weather system, utilizes data from the EAS local mesonet and refines the data and provides a quality control function. The EAS system incorporates all the extra local mesonet provided information that is at a much finer scale. A function of the EAS system is import mesonet data into Metgrid. However, the pre-processing including quality control provides for greater accuracy. The pre-processor function can be implemented with a computing system comprising the computing elements and components and functional computing modules illustrated in FIGS. 4, 8 and 9*a*.

For example, a lot of information that comes out of this mesonet is affected by things that aren't related to the weather. A classic example is when a municipal utility company has infrastructure that is downwind from a very large sign or other like obstruction on the side of the interstate such that the sign or other obstruction acts somewhat as a windshield. Even if a wind sensor is located in the area, the wind seen at the infrastructure will differ from that seen in the immediately surrounding area. The same thing can occur with building or natural obstructions. The EAS system can also perform other quality control functions like making adjustments for sensor station placement or making adjustments when there is an atmospheric tide in the atmosphere that actually causes the pressure—even when there is no weather—to vary in a cyclical manner, or making adjustment when the wind direction, wind speed, the temperature and pressure are correct, but the relative humidity always reports zero. In addition to the quality control function and the Mesonet pre-processor function also performs an assimilation or ingest of data function, where Metgrid incorporates data into the model.

The domain as described above can be broken up into a series of little cubes. Viewing the domain from the top down picture shows a grid of squares. However, sampling of the atmosphere, is not only just on the ground, but is also vertical. The method that EAS uses to solve the equations forward in time requires that we have the information (initial conditions) at regular uniform intervals in space, and these cubes should be uniform in size. They all should be the same size and information is needed at the cube intersections. However, typically sensors, thus data, is not available at those grid intersections. For example, typically one of the biggest users of weather information in the '20's, '30's, '40's and '50's was airports. Therefore, a majority of the National Weather Service observations are taken at airports. So typically sensor station have been somewhat clustered around major cities, thus not importable in a uniform grid. Importing the information or data into a nice rectangular uniform grid can be referred to as an objective analysis.

Therefore, not only are the stations from the National Weather Service irregularly spaced, they are also not strategically space for the local mesonet. Therefore, the ability to transform the information in an objective fashion onto the individual grids is problematic. With the present invention, there is an objective analysis method that is used to perform this function. There is a method that is utilized by the EAS system that can generally be referred to as the ObsGRID function that transforms all of the information from an irregularly spaced network of stations and puts imports the information on uniform cubical grids in a fashion that is sufficiently accurate for the necessary predictions. A Nyquist sampling technique can be utilized, which can be used along with a Barnes and/or Cressman sampling technique. This transformation is necessary for the ingest process.

ObsGRID transforms the data in a manner that can be ingested by MetGRID. Obsgrid generates something that Metgrid can read and it takes all of the pieces together, this material from the objective analysis, the National Weather Service, the lower boundary conditions, describing the topography, the land use, the soil moisture, soil temperature, and all other information, and combines it together to produce for the domain, a model domain, having lateral and lower and initial boundary conditions. The model boundary conditions describe the initial state of the atmosphere. In order for this model to work for prediction purposes, the EAS system accurately describes the state of the atmosphere when the model starts, which can be referred to as initial conditions. Further, the EAS system updates data at such a frequency that ability to initialize the model at an arbitrary instance in time is highly selectable. Typically previous systems could only initialize a forecast model at six (6) hour intervals and the upper atmospheric conditions may be data from a previous 12 hour interval. As indicated above sampling of the atmosphere with the EAS system occurs not only just on the ground, but it is also performed in the vertical as well. Therefore, EAS has strategically placed stations that samples in the vertical, which differs from the National Weather Service. So the data is in a full three dimensions. In addition to the three dimensions the EAS system, as discussed above can initialize the model at selected arbitrary times, which adds what can be referred to as a fourth dimension—three spatial dimensions and one in time, as well. So EAS is working in four dimensions and not just three because of the near real time data.

When the EAS is developing a forecasting model, the parameterization scheme can be tuned to address the specific forecasting need. For example, if high winds are of concern because of a potential adverse impact on an asset of concern then the EAS system must be able to forecast with a high level of accuracy the location of the high winds. To do an accurate forecast the EAS system will need to make sure to tune the model to produce the highest quality convection, i.e, the thunderstorms and clouds, and associated with that highest quality convection cloud forecast, a high quality wind forecast. Different parameterization schemes may be selected in order to optimize the forecast. Different parameterization scheme may be different depending on the different forecast need. Further, the EAS local Mesonet data can provide near real-time conditions such that the selection of the parameterization scheme can be based on that real-time information. There are generally four (4) categories of parameterization schemes—Surface Layer Parameterization having three (3) schemes, Boundary Layer Parameterization having four (4) schemes, Micro-physics having eight (8) schemes, and Cumulus having six (6). For example if a municipal electrical utility has a need where they are concerned about damage to assets caused by high winds, then EAS can select a parameterization scheme optimized for convection and the high winds associated with it. That now chooses how EAS will parameterize certain features within the model.

An example of how a parameterization scheme works is as follows, if EAS defines on of the cubes in the model as 1 kilometer on the side and 500 meters tall. For some clouds— or for some types of clouds—the system would completely fill this cube with the cloud, and may even extend the cloud on either side of the cube in the model. In which case, the system can describe the processes within the cloud very easily with this 1 kilometer cube. However, what happens when there is just the beginnings of a thunderstorm and it just begins to start up, and it just fills up only a portion of that 1 kilometer cube. The system couldn't describe accurately that cloud entirely. However the system can explain or describe its effects on what's going to happen within this 1 kilometer cube. There is a method that can be used such that even though it can't see the cloud itself, it can see the effects of the cloud on that particular cube. That's known as a parameterization scheme.

As mentioned above, there are various types of parameterization schemes, such as for example, there's a boundary layer parameterization scheme. Very close to the ground, for example, there is a layer that is about approximately 500 meters deep or typically 500 meters deep. There can be a lot of turbulence within that 500 meter layer. The system can't describe all of that turbulence within that little 500 meter depth, but it can tell you what effect that turbulence has on this one whole block of the atmosphere—this one little 1 kilometer cube. So there's a boundary layer parameterization. There is also a cumulus cloud parameterization. Inside of clouds, there's this whole process where ice is converted into—well, I raise air up in the atmosphere, it cools off, it forms water, it forms ice droplets, it rains. That process is far too small scale to describe on this 1 kilometer square, however, it can describe the effects of that process on what's happening inside that cube. Those are known as parameterization schemes.

The model can provide choices. If running the model at a very fine resolution, 200 meters, then do not need a cumulus parameterization scheme. The system can accurately describe the cumulus clouds at 250 meters. The model allows for choices to be made. For the boundary layer, if data is available, the Metgrid/Obsgrid process will allow the first 500 meters to be described if the observations are available. The model and the Obsgrid is generalized and flexible enough so that it can get the data, it can be process and the parameterization scheme can actually be removed and the boundary layer can be describe exactly. The actual real-time data from the EAS local Mesonet can provide information. Therefore, the system is flexible enough that it can choose between just describing the effects or actually reproducing whatever is happening there in the atmosphere completely.

A database of the most effective parameterization schemes for a given need can also be assembled and accessed by running the model with and without various surface layer parameterizations with and without cumulus parameterization and by taking a look and verifying the quality of the forecast for each one of these possible choices of parameterization schemes. Within, for example, the cumulus parameterization, there is actually a selection—there's three or four options that can be chosen—there's three or four different cumulus parameterization schemes and you can pick one. Or you could pick the other. Or you could pick none and actually reproduce the atmosphere entirely. The net result is a decision about—for a specific problem, what particular choice provides the best quality forecast, and the outcome would likely be different for different applications. The refinement of the optimization of the parameterization scheme is something that is an on going process. There is an automated tool that generates a skill score that rates the effectiveness of a parameterization scheme for a given need. The EAS system can review the skill score daily and so long as nothing happens or that skill score doesn't change dramatically, the system will have no need to make corrections. Other times, it is a flaw within the model or the parameterization scheme itself, which can be corrected.

There are different forecast and prediction needs depending on the asset of concern. In the case of a municipal electrical utility the assets of concern may be power lines and the like and the threat of concern may be icing. Typically an 8 hour window of warning is need to appropriately plan for such a weather event. However, in the case of a sporting event you may need less than an hour window of notice. For example, in the case of a baseball event you may need only about 5 minutes or 10 minutes warning to cover the field. In other words—what is happening now in the nearby surrounding area. The local mesonet of the EAS system will solve this problem and actually will watch the progression of the storm move across the local mesonet and when it gets to about 10 minutes away, for example, can provide adequate warning.

So part of the solution provided by EAS to the question of how big the domain is and how to place stations is very dependent on the particular problem that is trying to be solved. It is a time problem in the sense of how much is needed. It is also a spatial problem because EAS must determine how much spatial coverage is needed or how far to go back to get enough upwind or upstream data. So, the placement of the sensor stations for EAS is dependent in space and time on how much lead time is needed. There is a spatial and temporal resolution. The location of assets of concern is also a driver for placement of the sensor stations. Further, unique natural or land-use or infrastructure conditions can be a driver as well as known prediction problems. EAS has an optimization scheme to address the various needs.

There also may be areas of interest were EAS has determined an effective parameterization scheme in a particular region is not feasible thus actual data is needed thus driving the placement of sensor stations in the local mesonet. EAS is designed with locations to fill in gaps where information is needed to have an answer to or description of conditions so that EAS can report what is actually happening on a regular basis based on what is seen across the network in terms of how much longer, for example the icing event, is going to continue and how heavy the icing was going to be and how fast is it accumulating. The EAS system also allows for user input to make adjustments just based on user knowledge of current conditions or historical knowledge. Thus a user can alter the boundary layer parameterization scheme. There's a different choice for that particular combination. And so there's a list of these, all of these combinations that we, you know, have, there's this great big table that says if this is happening, then go pick this particular set of parameterization schemes.

EAS can also provide a threat index for an event that is designed to identify problem areas of interest that merits action or a closer watch. The threat index level can be determined by considering a combination of three factors including 1.) the type of asset; 2.) weather conditions that can potentially place the asset at risk; and 3.) special conditions in the area that can potentially amplify the threat. In the case of an electrical utility, the asset could be power lines or high tension towers. The weather conditions could be icing or high winds. The special conditions could be trees hanging over the power lines. The threat index could be a level rating of 0 to 100 where 100 is the highest threat level. EAS determines at what geographic locations and what predicted times will all three of those conditions exist and attach to that a number.

Therefore, for example, if you have winds of about approximately 70 miles an hour predicted 3 hours from now in a particular location and you there are overhead structures in the area and they have trees located there that are full of leaves and the soil moisture is high, —this will likely result in a very high threat index. However, if you have a location where there's hardly any trees and there's no overhead lines because it's all new construction, then the threat index would be substantially lower. A map grid of an area can be generated and the threat index data can be overlayed over the map. A graphical representation of high winds or icing for example can be provided as well as color high-lighting various regions having various threat indexes. The map will evolve and transition over time as the weather threat passes over. The system can also take into consideration historical climatology such as for example historical freeze lines to adjust prediction and this climatology information can also be used for EAS sensor station placement.

Utilizing the SCADA communication network available over power lines has facilitated the ability to place EAS sensors in areas that would have typically required satellite or short wave communication capability because in some areas there are no communication means. There aren't very many places in the US where there isn't electric power. This SCADA interface allows the EAS sensor stations to make an interne connection across a power line. And so that means now wherever there's a power line or some sort of electric power socket or something else like that, EAS can gain access to the SCADA communications network that runs on the power lines. SCADA is a standard protocol system control access and data analysis network. SCADA probes the entire power line infrastructure every few milliseconds. To access SCADA, an electronic conversion device is utilized to translate the SCADA protocol to that of a standard ethernet. So that means that an EAS sensor station can be placed anywhere there is an electric power line. The strategically placed EAS sensor station can monitor and communicate time, temperature, relative humidity, pressure, wind speed, wind direction, precipitation and the battery power or the charge rate due to the level of solar energy present, which tells how much sunshine. Use of an electric utility SCADA network to communicate information from the remote weather stations facilitates the ability to establish a local Mesonet network.

One embodiment of the present invention comprising a localized near term weather prediction function, a current static state environment input, a current static state infrastructure input, and a threat analysis function teaches a novel apparatus and method for a threat level index to predictor which indicates the localities which are most likely to be threatened by the exacerbation of an event by the weather, thereby equipping Emergency Response Management to then use the threat level index to determine where and when to martial personnel.

The EAS Process can use a solar powered, wireless Ethernet connected meteorological sensor suite. The solar charged battery supply is guaranteed to provide continues operation below 60 degrees latitude and will operate for at least 60 days without sun. Since there is no connection between the sensors and the power line, damage from thunderstorms is virtually eliminated and the sensors are immune to power line voltage surges. There can be wireless connectivity between the sensor station and the SCADA substation. The SCADA substations are located in areas where there are power lines. Thus the substations can be communicably connected via wireless transceivers to the EAS stations. The initial sensor calibrations for wind, temperature, relative humidity and barometric pressure are traceable to the National Institute of Standards and Technology. The passive solar shield for the temperature and humidity sensors are modeled after the ones designed by the National Weather Service. The meteorological sensor suite is capable of sampling the data every 2 seconds and transmitting data every 2 seconds. Thus the sensor suite is able to collect near real-time data. It is important to note that any wind gusts are not missed as the peaks are captured. In the current configuration, data is averaged over a one minute period before being transmitted to the central site. The averaging interval is remotely adjustable to handle different meteorological events. The sensor suite includes:

Anemometer
    Range: 0-67 meters per second
    Resolution: 1.0 unit.
        1 meter per second
        1 degree
    Accuracy: ±2% of full scale.
Temperature
    Range: −66° to +166° F.; −54° to +74° C.
    Accuracy: ±1° F.; ±0.5° C.

Relative Humidity
    Range: 0 to 100% RT.Y.H.
    Accuracy: ±2% at 25° C. Temperature compensated from −40° to 85° C.
Barometer
    Range: 551 to 1084 Millibars (hPa), absolute reading. Digital offset for site altitude.
    Accuracy: ±1.69 Millibars (hPa) at 25° C. Temperature compensated from −40° to 85° C.
Rainfall
    Range: Unlimited Tipping bucket with 8-inch diameter collector.
    Resolution: 0.01"; 0.25 mm.
    Accuracy: ±2% at 1 inch per hour.
Transceivers
    Range: Up to one-mile line of sight. Walls or other RF absorbing structures may reduce range.
    Frequency: 2.4 GHz spread spectrum 802.15.4. F.C.C. Approved.

Given that SCADA is a standard protocol system control access and data analysis network and that SCADA probes the entire power line infrastructure every few milliseconds, the ability for EAS stations to communicate across the SCADA network alleviates the need to invest in a huge infrastructure. The wireless transceivers at the substations can be equipped with an electronic module that take data transmissions from the local Mesonet stations and convert the transmission to a SCADA protocol format that can be transmitted across SCADA to a central location where the transmission can be converted to transmit the data via the internet to the EAS computing systems. The universal protocol of SCADA for electrical utilities across the country makes the present invention easily transportable from one region to another.

In order to insure that only correct data from the Mesonet are incorporated into the EAS process the data from the Mesonet stations is carefully examined. The data from each station is checked to insure that the values are within realistic ranges (level 1 check). The data is then compared against values for the same station for previous times (level 2 check) to insure that a single miss-transmission of data has occurred. The data is then compared with data from nearby stations to insure that several miss-transmissions or contaminated data have not occurred. In addition to the data from Mesonet, the EAS process also receives the larger scale model initialization data. The EAS process then performs the analysis of the existing weather conditions, creates the high spatial and temporal resolution forecasts, and creates the analysis and forecast graphics and web pages. A specialized computing facility is needed, and in this instance a High Performance Computing (HPC) facility can be used.

Traditionally, computer software has been written for serial computation. To solve a problem, an algorithm is constructed and implemented as a serial stream of instructions. These instructions are executed on a central processing unit on one computer. Only one instruction may execute at a time—after that instruction is finished, the next is executed. Parallel computing, on the other hand, uses multiple processing elements simultaneously to solve a problem. This is accomplished by breaking the problem into independent parts so that each processing element can execute its part of the algorithm simultaneously with the others. The processing elements can be diverse and include resources such as a single computer with multiple processors, several networked computers, specialized hardware, or any combination of the above.

The single-instruction-single-data (SISD) classification is equivalent to an entirely sequential program. The single-instruction-multiple-data (SIMD) classification is analogous to doing the same operation repeatedly over a large data set. This is commonly done in signal processing applications. Multiple-instruction-single-data (MISD) is a rarely used classification. Multiple-instruction-multiple-data (MIMD) programs are by far the most common type of parallel programs. Parallel computers can be roughly classified according to the level at which the hardware supports parallelism. This classification is broadly analogous to the distance between basic computing nodes. These are not mutually exclusive; for example, clusters of symmetric multiprocessors are relatively common. A cluster is a group of loosely coupled computers that work together closely, so that in some respects they can be regarded as a single computer. Clusters are composed of multiple stand-alone machines connected by a network. While machines in a cluster do not have to be symmetric, load balancing is more difficult if they are not. The most common type of cluster is the Beowulf cluster, which is a cluster implemented on multiple identical commercial off-the-shelf computers connected with a TCP/IP Ethernet local area network.

The HPC facility makes use of Message Passing Interface (MPI) standard to decompose a program that is to be run on a cluster into segments that can be safely run on individual nodes of the cluster. The primary or master node that initiates the process passes a segment to the individual nodes in the cluster via the MPI software. Once each node has completed its segment, it passes the information back to master node again via the MPI software. The EAS process currently uses COTS computers from Sun Microsystems running the Solaris operating system. The use of clustered COTS computers allows the creation of a HPC facility at minimal cost.

Connecting together the individual weather stations would traditionally require a dedicated Ethernet or a radio to transmit the data from the weather station to the central facility. The dedicated Ethernet connection has proven to be too expensive to use in an ongoing basis and is only in use for special short-term projects. Although the radio based links are possible their limited bandwidth prevent rapid transmission of data from the remote site to the central facility. Working in cooperation with the electric power industry, the data from the remote stations are connected to the power industry's Supervisory Control And Data Acquisition (SCADA) network. The SCADA network makes use of the power lines to monitor and control the electric power grid, monitor and read electric power meters and notify the power company of anomalous conditions. This high bandwidth connection allows the weather data to be piggy-backed onto the existing data stream. This allows the weather stations to be monitored continuously. Since the electric power industry has facilities located throughout any region the networked weather station can be placed anywhere the electric power industry or any other group making use of the SCADA network is located, including water treatment and distribution, wastewater collection and treatment oil and gas pipelines, and large communication systems.

Figure 2:
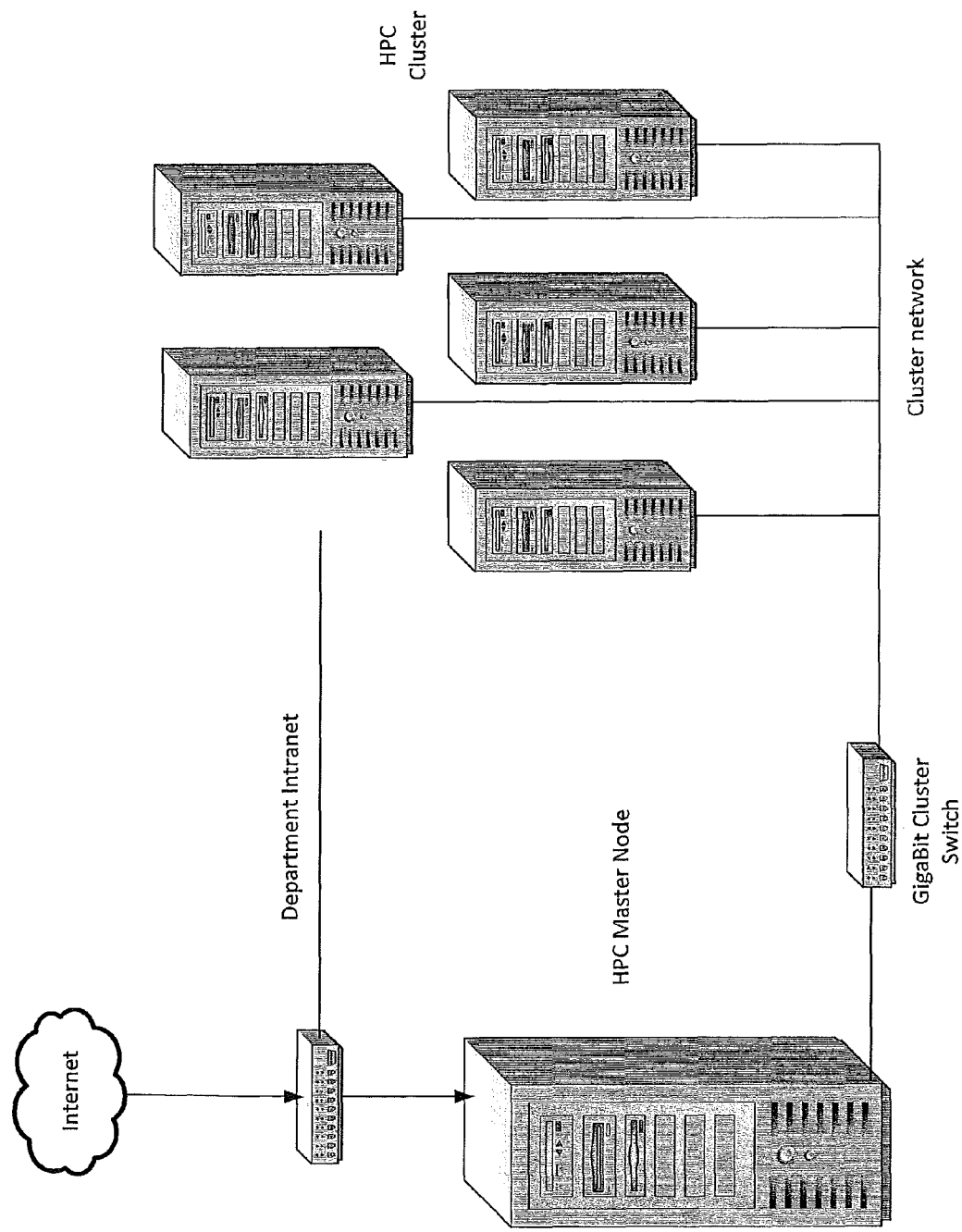
FIG. 2 is a functional illustration of EAS.

The details of the invention and various embodiments can be better understood by referring to the figures of the drawing. Referring to FIGS. 1 and 2, an illustration of one embodiment of an EAS environment is provided. As previously discussed the sensor arrays can be remotely located strategically based on regional characteristics, maximizing spatial and temporal resolution and the specific application, for example an electrical utility. The sensor array includes an anemometer, a temperature sensor, a humidity sensor, barometer, a rainfall detector and a wireless transceiver. The sensor array must be place atop an electrical pole, tower or other high structure that allows for mounting of the sensor array such that the sensing is unobstructed. The sensor array can be solar powered, battery powered or powered by a proximate electrical line. A battery power source can be rechargeable that is recharged by a hardwired electrical source or by solar power.

The transceiver can transmit the sensed data wirelessly to a substation that can buffer the data and transmit the data via an Ethernet interface to a SCADA network. For example in the utility industry, SCADA networks are often already in place to monitor the operation of the infrastructure, for example the operation of a substation or a transformer. An existing SCADA network will have a data protocol whether the protocol is proprietary or a standard protocol. Therefore a converter for converting the sensor data to a protocol or format of a SCADA network may be necessary. A converter or concentrator can be installed at the input of the SCADA system for converting the sensor data. Once the sensor data is converted, it can be sent to a SCADA server which can process the data for transmission to a central location where the data can be evaluated. The information can be transmitted by the SCADA server over a wide area network, for example the Internet, to a EAS system. The EAS system can receive the information sent over a wide area network through a proxy server, which can transmit the information to a EAS master node server. The EAS master node server can decompose and parse the data for further processing by the multi-core client node servers.

Placement of a sensor station for the local mesonet can be determined by considering three primary parameters and they are—1.) the type of weather threat/event of concern; 2.) the type and location of the asset that is potentially threatened; 3.) extraneous unique local conditions that may render an otherwise predictable environment unpredictable or magnify the threat level of the weather threat/event even when the weather threat/event would have normally been a non-event. Item 1.), though considered, can be rendered of little or no effect if each sensor station placed has the entire suite of sensor types and the sensor station is optimally placed such that each sensor type will get a good reading. The stations also can have the ability to sample in the vertical. However, placement of a station for optimal reading of all sensor types will be overridden if the asset of concern is most threatened by a particular type of weather threat/event such that placement is skewed toward a placement that provides best sensing capability for that particular type of weather threat/event that the asset is most endangered by. For example, a power line may be most threatened by icing or high winds. Therefore, the most heavily weighted parameter can likely be the type and location of the asset that is potentially threatened. Placement of sensor stations are made to provide the best coverage for the assets of concern and placement of stations are skewed toward a placement that allows for best sensing of a weather threat/event of most concern. Item three can be natural or man made obstructions or objects or climatologically induced conditions that hinder normal predictive capabilities or that can increase the threat level above what it would otherwise normally be. For example, a building may hinder an accurate reading of wind conditions. Traditional placement of sensor stations have typically resulted in placement of sensor station in and around major airports because of there typical proximate to large metropolitan areas. If it is decided to install an EAS system in an region, then sensor stations can be installed strategically at various locations as dictated by the above parameters in order to form a local mesonet network, which provides coverage for the assets of concern in the region. The local mesonet can be implemented and layered in combination with other available data as discussed above.

Figure 3:
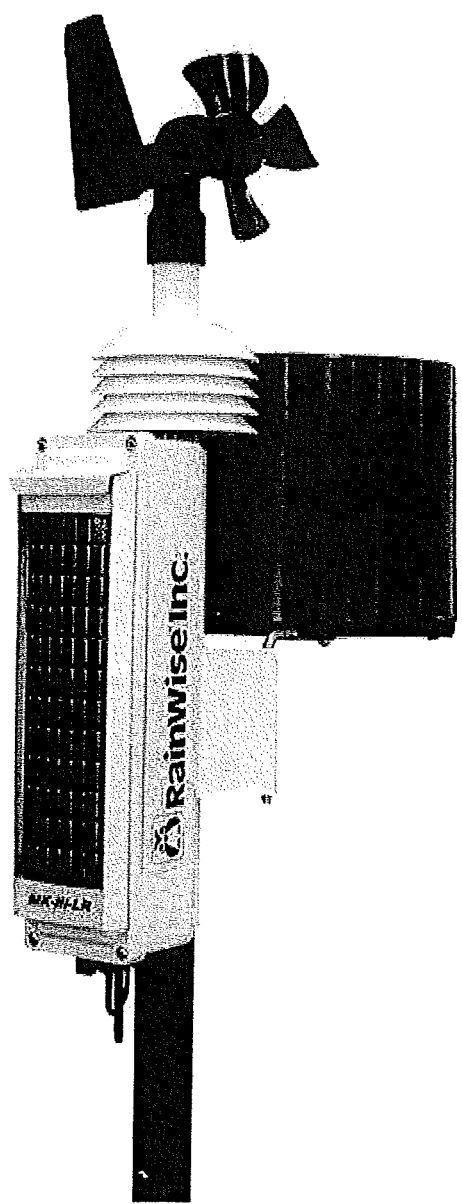
FIG. 3. is a functional illustration of a sensor suite.

Referring to FIG. 3 an illustration of a representative sensor suite is provided. The sensor suite can include an Anemometer sensor having a range of about approximately 0-67 meters per second and can have a resolution of 1.0 unit, 1 meter per second, 1 degree with an accuracy of +2% of full scale. The sensor suite can have a temperature sensor having a range of about approximately −66° to +166° F. (−54° to +74° C.) with an accuracy of about approximately +1° F. (±0.5° C.). The suite can include a sensor to detect relative humidity having a range of about approximately 0 to 100% RH with an accuracy of about approximately ±2% at 25° C. and with a temperature compensated from about approximately −40° to 85° C. The suite can include a barometer having a range of about approximately 551 to 1084 Millibars (hPa), with an absolute reading, a digital offset for site altitude and an accuracy: ±1.69 Millibars (hPa) at 25° C. and temperature compensated from −40° to 85° C. The suite can include a rainfall detector having an unlimited tipping bucket with 8-inch diameter collector with a resolution of about approximately 0.01" (0.25 mm), and an accuracy of about approximately ±2% at 1 inch per hour. The suite can include wireless transceivers having a range of up to one-mile line of sight with a frequency of 2.4 GHz spread spectrum 802.15.4. F.C.C.

A radar system is another type of sensing device that can be utilized for meteorology. Generally, the category of radar systems commonly referred to as Doppler radar can be utilized. This implementation can use a Doppler radar system in combination with other sensing devices discussed herein or can be used independently. A Doppler analysis can provide a more accurate higher spatial and temporal analysis of the state of the atmosphere than is possible with other tools. This higher quality analysis of the state of the atmosphere can provide a higher quality initial state for the model. There can be limitations in that the domain of the analysis is smaller than with other methods, but in combination they provide a powerful tool to initialize the model. When used in combination, the implementation can generally be referred to as a Earth and Atmospheric Science/Doppler RADAR Analysis System (EAS/DRAS); and when used independently, this implementation can be simply referred to as DRAS.

Radar equipment may perform a three dimensional sampling of radial velocities of precipitations. However, there are often problems in synthesizing the raw radial velocity fields to obtain three dimensional wind fields. One difficulty in three dimensional wind recovery is due to the use of an air mass continuity equation for resolving the vertical air motion. Using three or more radars can help in determining a vertical air velocity component, however, the radars can typically operate at low elevation angles, which can take away from the vertical component detection and the measured vertical motion is that of precipitating particles and can be corrected for their terminal fall velocity. Radial wind velocity can be utilized to infer information regarding the horizontal wind field. Also reflectivity observations can be utilized to retrieve the complete three-dimension wind field.

Knowledge of the three dimensional wind field as well as pressure and temperature perturbations at different scales of motion is of extreme importance for a wide range of meteorological applications. A Doppler radar is capable of sampling the eddy structure of convective-scale flows in time and space, although only measure one wind component out of three. Radial velocities can be detected by Doppler radar equipment, but retrieval of the kinematic and thermodynamic properties of the flow is also needed.

Initial and boundary conditions of a numerical model can be determined that minimize the difference between radar observations and corresponding variables forecasted by the numerical model. This method can be seen as an inverse method where the unknown model parameters are derived from observations distributed in space and time. In addition, instead of determining the state of a numerical model, Doppler radar observations can be inserted into the numerical model. Each time the radial velocity is inserted, two other wind components can be adjusted with respect to the continuity equation and some mean quantities. Then the pressure and temperature perturbations can be retrieved. The first step can be considered a diagnostic step, whereas the second can be considered a correction procedure that forces the model variables to match observations. Refined quality control, editing and analysis techniques can provide a more accurate three dimensional wind field recovered from the observed radial velocities and radar reflectivities.

A Doppler radar is a specialized radar that makes use of the Doppler effect to produce velocity data about objects at a distance. It does this by beaming a microwave signal towards a desired target and listening for its reflection, then analyzing how the frequency of the returned signal has been altered by the object's motion. This variation gives direct and highly accurate measurements of the radial component of a target's velocity relative to the radar. Doppler radars are used in aviation, sounding satellites, meteorology, police speed guns, radiology, and bi-static radar (surface to air missile).

Partly because of its common use by television meteorologists in on-air weather reporting, the specific term "Doppler Radar" has erroneously become popularly synonymous with the type of radar used in meteorology. Most modern weather radars use the pulse-doppler technique to examine the motion of precipitation, but it is only a part of the processing of their data. So, while these radars use a highly specialized form of doppler radar, the term is much broader in its meaning and its applications.

The Doppler effect (or Doppler shift), named after Austrian physicist Christian Doppler who proposed it in 1842, is the difference between the observed frequency and the emitted frequency of a wave for an observer moving relative to the source of the waves. It is commonly heard when a vehicle sounding a siren approaches, passes and recedes from an observer. The received frequency is higher (compared to the emitted frequency) during the approach, it is identical at the instant of passing by, and it is lower during the recession. This variation of frequency also depends on the direction the wave source is moving with respect to the observer; it is maximum when the source is moving directly toward or away from the observer and diminishes with increasing angle between the direction of motion and the direction of the waves, until when the source is moving at right angles to the observer, there is no shift.

An analogy would be pitcher throwing one ball every second in a person's direction (a frequency of 1 ball per second). Assuming that the balls travel at a constant velocity and the pitcher is stationary, the man will catch one ball every second. However, if the pitcher is jogging towards the man, he will catch balls more frequently because the balls will be less spaced out (the frequency increases). The inverse is true if the pitcher is moving away from the man; he will catch balls less frequently because of the pitcher's backward motion (the frequency decreases). If the pitcher were to move at an angle but with the same speed, the variation of the frequency at which the receiver would catch the ball would be less as the distance between the two would change more slowly.

From the point of view of the pitcher, the frequency remains constant (whether he's throwing balls or transmitting microwaves). Since with electromagnetic radiation like microwaves frequency is inversely proportional to wavelength, the wavelength of the waves is also affected. Thus, the relative difference in velocity between a source and an observer is what gives rise to the Doppler effect. Objects moving toward an antenna increases the reflection wave's frequency, while objects moving away from the antenna decreases the wave's frequency. Rain drops and other objects in the air can reflect a radar emission signal.

Weather radars send out radio waves from an antenna. Objects in the air, such as raindrops, snow crystals, hailstones or even insects and dust, scatter or reflect some of the radio waves back to the antenna. Weather radars, including Doppler, electronically convert the reflected radio waves into pictures showing the location and intensity of precipitation. Doppler radars also measure the frequency change in returning radio waves. Waves reflected by something moving away from the antenna change to a lower frequency, while waves from an object moving toward the antenna change to a higher frequency. The computer that's a part of a Doppler radar uses the frequency changes to show directions and speeds of the winds blowing around the raindrops, insects and other objects that reflected the radio waves. These pictures of wind motions in storms, or even in clear air, can be used to more clearly understand what's happening now and what's likely to happen in the next hour or two.

The formula for radar doppler shift is the same as that for reflection of light by a moving mirror. There is no need to invoke Einstein's theory of special relativity, because all observations are made in the same frame of reference. The result derived with c as the speed of light and v as the target velocity gives the shifted frequency ($F_r$) as a function of the original frequency ($F_t$):

$$F_r = F_t\left(\frac{1+v/c}{1-v/c}\right)$$

The "beat frequency", (Doppler frequency) ($F_d$), is thus $$F_d = F_r - F_t = 2v\frac{F_t}{(c-v)}$$

Since for most practical applications of radar, v<<c, so (c−v)→c. We can then write:

$$F_d \approx 2v\frac{F_t}{c}$$

There are four ways of producing the Doppler effect. Radars may be coherent pulsed (CP), pulse-Doppler radar, continuous wave (CW), or frequency modulated (FM). CW Doppler radar only provides a velocity output as the received signal from the target is compared in frequency with the original signal. Early Doppler radars were CW, but these quickly led to the development of frequency modulated continuous wave (FM-CW) radar, which sweeps the transmitter frequency to encode and determine range.

The CW and FM-CW radars can normally only process one target, which limits their use. With the advent of digital techniques, Pulse-Doppler radars (PD) were introduced, and Doppler processors for coherent pulse radars were developed at the same time. The advantage of combining Doppler processing with pulse radars is to provide accurate velocity information. This velocity is called range-rate. It describes the rate that a target moves toward or away from the radar. A target with no range-rate reflects a frequency near the transmitter frequency and cannot be detected. The classic zero doppler target is one which is on a heading that is tangential to the radar antenna beam. Basically, any target that is heading 90 degrees in relation to the antenna beam cannot be detected by its velocity (only by its conventional reflectivity).

One implementation of the system is able to recover the three dimensional wind field perturbation pressures and perturbation temperatures in real-time from multiple Doppler radars. The perturbation pressure field is the interaction of an updraft with the ambient environment and a bias toward one cell. Potential temperature perturbation is defined as the difference between the potential temperature of an atmospheric boundary layer and the potential temperature of the free atmosphere above the atmospheric boundary layer.

Boundary layer three dimensional wind field, temperature perturbations and pressure perturbations are an important factor in governing spatial distributions and temporal variations of weather and atmospheric conditions in any given region. Standard upper air observations lack temporal and spatial resolution and can lead to an inadequate description of the three dimensional wind field, temperature perturbation and pressure perturbations. This is particularly true in area having complex terrain or areas having large infrastructure, such as large urban areas. Synoptic-scale flows can be greatly modified by topography and mesoscale and local thermal forcing. Low level wind fields, temperature perturbations and pressure perturbations can be unpredictable and vary significantly in areas having complex terrain.

The EAS/DRAS implementation utilizes refined quality control, editing and analysis techniques to recover a more accurate three dimensional wind field from the observed radial velocities and radar reflectivities. The more accurate three dimensional wind field provided by the EAS/DRAS implementation can then be used with an inversion technique to compute realistic perturbation pressures and perturbation temperature fields and a measure of the magnitude of errors in the recovered fields. The EAS/DRAS implementation can be exercised with as few as two land based radars and can be adapted to work with ship borne radars, aircraft borne radars, and mobile land based radars. The EAS/DRAS implementation can recover these fields in real-time allowing radar operators to make more informed decisions about meteorological conditions and three dimensional wind fields. The more accurate three dimensional wind field can be used with an inversion technique to compute realistic perturbation pressures and perturbation temperature fields, and error magnitudes in the recovered fields, therefore, can be used to predict wind field changes and wind loading over a time duration. This can be particularly useful with wind turbine wind farms, where the wind predictions can be used for tuning or orienting a wind turbine for maximum generation. Predicting the wind fields around the wind turbines with the appropriate spatial and temporal scales necessary to initialize numerical models at scales under 4 km and 10 minutes; and can be crucial to efficient management of a wind farm.

One implementation uses a multiple-Doppler radar system which has the ability to retrieve the three-dimensional wind field. There are four primary parameters involved when observing a wind field using radar and they are (u—longitudinal velocity, v—lateral velocity, w—vertical velocity, and Vt—terminal velocity). For example four radars can be utilized providing four independent samples. Three Doppler radars can be used to recover the three-dimensional winds by using three horizontally pointing radars and one vertically pointing radar can be used. However, a single Doppler radar can also provide useful information concerning the structure of convective storms. The dual Doppler radars can be utilized to recover the u, v and w wind components from the radial velocities obtained from the Doppler radars. Then the perturbation pressures, densities and temperatures can be recovered from the three dimensional wind field. The theory and procedures behind processing the dual-Doppler radar data and recovering the thermodynamic information are somewhat dissimilar, yet they are dependent on each other. Changes in the method of recovering the perturbation pressures necessitate changes in the method for recovering the wind-field and vice versa. This interdependence requires that the theory and procedures be dealt with together.

In one implementation the radial velocities can be expressed as a function of u, v, and w wind components. The terminal velocity can be expressed from the relationship to equivalent radar reflectivity. The vertical velocity can be expressed from the anelastic continuity equation. The solution can be done in a stepwise manner where the horizontal winds are kept consistent between levels and the vertical velocity is consistent with the horizontal winds. This permits the sequential relaxation of the pressure equation to be done on a level-by-level basis rather than in a three-dimensional manner.

Given the four relationships and four unknowns, the u, v and w components of the wind may be computed in a stepwise manner. For example the process can begin at one boundary of a storm, where w is assumed to be 0. For example the stepwise process can start at the ground, and assumes that the vertical velocity is 0 or very nearly zero there. The same condition applies to the top of the storm. The choice of boundary conditions also determines the direction of the vertical velocity integration. Starting at the top of the storm requires downward integration. In downward integration, for example, the vertical velocity maximum can occur near 6 km and almost turns back to zero. The appearance of the vertical velocity profile for downward integration is near to the true profile within the storm.

The computation of the u, v and w wind components can begin at the boundary where w is assumed to be zero and Vt is computed. The u and v wind components can then be computed using the relationship derived by Armijo (1969) and Brandes (1977a). Given the u, v and w components at the first level, the divergence and vorticity can be computed. Using a one-sided space difference, the vertical velocity at level 2 can be computed from the anelastic continuity equation and the hydrostatic adiabatic density. Using the vertical velocity at level 2 computed from level 1 data, the horizontal winds, divergence and vorticity can be computed for level 2. Using the divergence and hydrostatic adiabatic density at level 2 the vertical velocity at level 3 is computed. The synthesis of the u, v and w components can proceed until the last level of the storm is reached. In practice the vertical velocity at level 2 is computed and then a linear interpolation to a height is used to obtain the vertical velocity at level 1. This process is repeated multiple times until the difference between iteration passes is less than a pre-determined number. The magnitude of the assigned vertical velocity at the top of the storm never exceeds 5 m s$^{-1}$.

The technique can use sequential relaxation to solve for the Lagrange multipliers $\lambda$ and the weights $\alpha$ and $\beta$. However, if it is assumed that the special case where $\alpha$ is a function of y alone and $\beta$ is a function of x alone, a special form results that allows the correction of the divergence and vertical velocity fields. This form of the variational constraints does not adjust the horizontal winds and results in a slight imbalance in the wind fields. The adiabatic hydrostatic density can be computed by rearranging the first law of thermodynamics. The density at the ground, $\rho_{00}$, is computed from the pressure and temperature at the ground obtained from a sounding launched from a sounding site near the base radar. The temperature at each analysis level was also obtained from this sounding.

In practice the computations start at the top of the storm where the vertical velocity is assumed to be zero. The terminal velocity is computed from and the u and v wind components are computed from. This defines the three wind components at the first level. To complete the computations at this level, the vertical component of vorticity and divergence are computed. The divergence and adiabatic hydrostatic density must be known at both the current level and the next level at which the vertical velocity is to be computed. The density at the next level is available. However, the divergence is not. In order to compute the vertical velocity at the next level, the divergence and density at the current level are assumed to represent the mean divergence and density across the two layers. This is equivalent to using a one-sided space difference in the forward sense. The derivative, although computationally stable, is noisier than it's centered difference counter-part. This implies that there is a larger error in the vertical velocities and that the vertical velocity may not be entirely consistent with the horizontal velocities. This may make the computation of the perturbation pressures more difficult, since the equations may no longer be elliptic and the solution will not converge. Once the vertical velocity at the next level is computed the horizontal velocities, horizontal divergence and vertical vorticity are computed. The vertical velocity at the next level is once again computed and the procedure moves stepwise down from the top of the storm. Once all the u, v and w wind components, the divergence and vorticity have been computed; the horizontal wind fields, vertical velocities and divergences are plotted and analyzed. These plots are then carefully examined, any remaining bad data are removed or corrected and the location and size of the updraft are determined. The program is then rerun with the corrected data set and the vertical velocity field at the top of the storm redefined.

In general, the fields of horizontal winds, the vertical velocity and the divergence are consistent. In a few locations, however, the fields are inconsistent. This is due primarily to spurious divergence and computational problems. In order to reduce these problems, the vertical velocity and divergence fields are modified. An iterative procedure is possible, however, a variational integral constraint improves the results significantly. In effect the vertically integrated horizontal divergence is used as an integral constraint. If certain assumptions are made, however, the sequential relaxation may be done away with and the corrections made after the u, v and w wind components are computed. A correction factor for the divergence fields, can a correction factor for the vertical velocity can be obtained. The correction factor for the divergence is a constant with height, but that the vertical velocity correction factor varies linearly with height.

The six basic equations common to meso-meteorology can be used to derive the perturbation pressure, density, and virtual temperature fields from the dual-Doppler radar derived winds. In one implementation a storm-relative coordinate system can be used for the perturbation pressure computations. In order to compute the perturbation virtual temperatures via the equation of state, the perturbation densities, $\rho'$, are necessary. Perturbation densities may be computed from the third equation of motion, once the perturbation pressures are known. It is essential to know the confidence level of the data before the numerical results can be properly interpreted.

Errors can occur in the data reduction and the computational procedures, and the effects of these errors are important in the interpretation of the results. An understanding of the computational and data reduction errors can lead to better techniques for collecting the data and to a better understanding of the results. There are two basic areas where error may occur: Errors in the computed thermodynamic fields due to errors in the wind field; and Errors in the computed thermodynamic fields due to errors in the computational technique used.

Errors in the wind field can be partially attributed to data reduction errors. In reality, the winds interior to the storm may have changed and the storm may have advected downstream with the wind during the time that the radar was scanning the storm. The problem is to reduce the observations to a common time and location. To do this would require two complete scans of the storm so that the radial velocities could be interpolated to a common time. Reducing the observations to a common location is less of a problem than reducing the observations to a common time. During the time period for the radars to scan the storm's volume, the storm is moving at a known translation speed. Thus the observations are displaced by a distance that is equal to the elapsed time since the beginning of the scan through the storm times the translation speed of the storm. If the radars begin to scan the storm at ground level, the largest error will be committed at the top of the storm. The errors made by choosing a particular Ze–Vt relationship are usually small and are a function of the elevation angle. The larger the elevation angle the more important the (w+Vt) term becomes and the larger the error made by improperly computing Vt.

Since the radial velocity used in computing the u and v components is the mean Doppler velocity ($\dot{V}_d$) for each range gate, the total width of the spectrum gives us an estimate of the error. For example if the velocity spectrum appeared broad the radial velocity estimated by ($\dot{V}_d$) will be poor and will not represent the true wind field in the storm. On the other hand if the velocity spectrum was narrow and peaked the radial velocity estimated by ($\dot{V}_d$) will be very good and represent the true velocity at the point in question. Hence the second moment gives us a measure of the error. An estimate of the error in the u and v components of the wind can be obtained by substituting typical values of the first moment of the Doppler spectrum. In summary it can be said that the problem of errors in the derived Doppler wind fields is a function of the Doppler spectrum width and the geometry of the situation.

Due to integrating the anelastic continuity equation to compute w, the divergence of the horizontal wind field must be integrated vertically. Since the divergence is the small difference between two large numbers, it is the largest source of errors in the computations. The effects of divergence can be minimized by the choice of the method of integrating the anelastic continuity equation. Errors in the vertical velocity computations are cumulative, and those errors occur at the beginning of the integration and propagate through the rest of the integration. When choosing the storm top as the starting place of the integration, the errors have less effect because of the smaller densities at the top of the storm. This allows the integration to begin with smaller errors and to extend further before the errors become significant.

Errors in the perturbation pressure, density and temperature fields are the result of two general types: Those due to errors in the input data; and Those due to errors in computational procedures. When all factors are considered, the horizontal and vertical wind fields have approximately a 10% error. There is an approximate linear relationship between the errors in the wind field and the errors in the perturbation pressures, i.e., a 10% error in the input wind field produced a 10% error in the perturbation pressure field. Although the model generated winds are not similar in nature to the dual-Doppler derived winds, the technique used to obtain the perturbation pressures is the same. This isolates the errors in the numerical techniques and the errors in the wind field. The analytical winds insure that the errors are isolated to those inserted by the random error generator, and that there are no errors due to processing the data. In this way the perturbation pressure recovery technique is tested with the assurance that no other sources of errors affect the results. The estimated errors in the perturbation pressures and vertical motion fields are approximately 10%, and the error in the virtual temperature field is expected to be of similar magnitude.

The second source of errors in the computed thermodynamic fields is errors due to computational procedures. Computational errors are due primarily to inadequate resolution of all the important waves within the storm itself. These errors are due to improper choice of grid spacing and a poor choice of finite differencing technique. One sided space differencing can be used along the boundary of the grid, along the areas where the data were missing and in the vertical velocity computations.

A single-Doppler analysis possible when the organized structure of the feature is quasi-linear. If the magnitude of the horizontal divergence along the beam is much larger than that tangent to the beam then the flow is primarily normal to feature. In this case we can assume that a single Doppler estimate of the flow is representative of flow in the quasi-linear feature. This finding strongly suggests that the simplified anelastic continuity equation may be employed to estimate the vertical velocity in a direction normal to the frontal system using a single-Doppler radar. In this case a second methodology can be employed to determine the flow in the system from a single radar.

To reiterate, the terminal velocity, Vt, can be recovered from the radar reflectivity via a Z–Vt relationship and the vertical velocity can be calculated from the anelastic continuity equation. The anelastic continuity equation in a cylindrical coordinate system (r,θ,z,t) with the origin at the radar site can be written as:

$$\frac{\partial \rho_{0a} r V_{rad}}{r \partial r} + \frac{\partial \rho_{0a} r V_\theta}{r \partial \theta} + \frac{\partial \rho_{0a} W}{\partial z} = 0$$

where $V_{rad}$ is the radial velocity component, $V_\theta$ is the tangential velocity component, w is the vertical velocity component, r is the radial distance to the radar, θ is the azimuth angle, and the other symbols have their usual meanings. As discussed earlier, if we assume that the cross-beam components $$\left(\frac{\partial}{\partial \theta} \text{terms}\right)$$

are small compared to the components parallel to the beam $$\left(\frac{\partial}{\partial r} \text{terms}\right),$$

then the simplified form of the anelastic continuity equation can be written as:

$$\rho_0(z)\left[\frac{V_{rad}}{r} + \frac{\partial V_{rad}}{\partial r}\right] + \frac{\partial \rho_0 w}{\partial z} = 0$$

Where the first term on the left is the horizontal divergence in the plane of the vertical cross section, and $\rho_0(z)$ is the observed environmental air density. The radial velocities recovered by the radar are the vector sum of the horizontal velocities, $V_{rad}$, the terminal velocities, $V_t$, and the vertical velocities w of the targets. If the elevation angle $\phi$ is small enough and the vector sum $V_t$+w is small compared to V, then VRAD can be found from:

$$V_r = V \cos \phi$$

where V is the measured radial velocity. Since the elevation angle $\phi$ is small (<20°) in this study, the horizontal velocities can be recovered with reasonable accuracy.

In this simplified form, the anelastic continuity equation can be integrated downwards starting at the top of the storm to give the vertical velocity at each successive layer downward.

Where the overbar means an average over the layer, D is the horizontal divergence as defined earlier, and $\Delta z$. The vertical velocity computed is subject to errors as a result of the accumulation of errors in the divergence field. The magnitude of the errors in the vertical velocity field is a function of the quality of the wind field derived from the radial velocities. To minimize these errors, a variational adjustment can be made to the "observed" values of w to find the "true" values of w.

DRAS Operational Analysis:
Multiple-Doppler Analysis

One of the most important advantages of using a multiple-Doppler radar analysis system over a conventional surface and/or upper air mesonet is the ability to retrieve the three-dimensional wind, pressure and temperature fields at high spatial and temporal resolutions. Using multiple radars detailed information about the structure and evolution of mesoscale systems can be determined in near real-time. Since the accuracy of a numerical weather prediction model depends on how well the initial conditions, as well as, the lateral and lower boundary conditions, determining with high precision the initial state of the atmosphere is crucial to accurately forecasting the future state of the atmosphere. In the region where a multiple Doppler analysis is conducted the three-dimensional wind, pressure and temperature fields can be determined as often as every three minutes with a resolution as small as 250 meters. Providing data at these resolutions in the pre-storm environment significantly improves the quality of the numerical forecast.

Doppler radars measure the back-scattered microwave radiation and the phase-shifted signal due to target motion. The back-scattered radiation is converted into an average drop size diameter to the sixth power, commonly known as the radar reflectivity. The phase-shifted signal is converted into the velocity parallel to the radar beam of the targets, commonly known as the radial velocity. Although the radial velocity and reflectivity from a single Doppler radar provides a significant new source of information about the structure of the atmosphere the value of the radial velocity is somewhat limited because it only provides the magnitude of the velocity vector that is parallel to the radar beam.

Derivation of the Three-Dimensional Wind Field

Recovery of the three-dimensional wind field from the radial velocities from Doppler radar measurements was discussed in detail by Armijo (1969), who developed a method and works in a strictly Cartesian coordinate system.

1. Computation of Horizontal Winds

From the geometry the radial velocities can be expressed as a function of the u, v and w wind components as $$V_{r1}(x, y, z) = \frac{1}{R_1}[u(x - x_1) + v(x - y_1) + (w + V_t)z] \quad (1a)$$

$$V_{r2}(x, y, z) = \frac{1}{R_1}[u(x - x_2) + v(x - y_2) + (w + V_t)z] \quad (1b)$$

where
$R_1$=radial distance from radar 1 to target,
$R_2$=radial distance from radar 2 to target,
$V_{r1}$=radial velocity measured by radar 1,
$V_{r2}$=radial velocity measured by radar 2,
(u, v, w)=components of the true wind in the (x, y, z) directions,
(x,y,z)=location of the target with respect to the origin,
$(x_1,y_1,z)$=location of radar 1 with respect to the origin,
$(x_2,y_2,z)$=location of radar 2 with respect to the origin,
$V_t$=terminal velocity of target Equation 1 can be simplified if we assume that one of the radars is located at the origin of the coordinate system. If we assume that radar 1 is the origin, (7.1) may be expressed as $$V_{r1}(x, y, z) = \frac{1}{R_1}[ux + vy + (w + V_t)z] \quad (2a)$$

$$V_{r2}(x, y, z) = \frac{1}{R_2}[ux_2 + vy_2 + (w + V_t)z] \quad (2b)$$

If we now assume distances $(x-x_1)$, $(y-y_1)$, $(x-x_2)$, $(y-y_2)$ can be replace with $x_1, y_1, x_2, y_2$ $$V_{r1}(x, y, z) = \frac{1}{R_1}[ux_1 + v_1 + (w + V_t)z] \quad (3a)$$

$$V_{r2}(x, y, z) = \frac{1}{R_1}[ux_2 + v_2 + (w + V_t)z] \quad (3b)$$

This gives two equations and four unknowns, (u, v, w, Vt). In order to solve for u, v and w, two additional equations will be necessary. The terminal velocity, Vt, can be obtained from a $Z_e$-$V_t$ relationship. The raindrop terminal velocity relationship of Sekhan and Sirvastva (1971) is used along with the density-height correction of Foote and DeToit (1969). The final form of the $Z_e$-$V_t$ relationship becomes $$V_t = -4.32 Z_e^{0.052} \quad (4)$$

Where
$V_t$=raindrop terminal velocity, and
$Z_e$=equivalent radar reflectivity factor The vertical velocity, w, is computed from the anelastic continuity equation in the form:

$$\nabla \cdot \left(\bar{\rho}_a \dot{V}\right) = 0 \quad (5)$$

Where
$\bar{\rho}_a$=adiabatic hydrostatic density a function of height alone, and
$\dot{V}$=wind velocity vector This gives four equations and four unknowns and permits the solution to be obtained in a stepwise manner. Since the solution is done in a stepwise manner the horizontal winds are kept consistent between levels and the vertical velocity is consistent with the horizontal winds. This permits the sequential relaxation of the pressure equation to be done on a level-by-level basis.

Solving for the u and v wind components from Eq. (4a) and (4b), yields:

$$v = \frac{[R_1 x_2 V_{r1} - R_2 x_1 V_{r2}]}{[y_1 x_2 - y_2 x_1]} - \frac{[x_2 - x_1(w + V_t)]}{[y_1 x_2 - y_2 x_1]} \quad (6a)$$

$$u = \frac{[R_1 y_2 V_{r1} - R_2 y_1 V_{r2}]}{[x_1 y_2 - x_2 y_1]} - \frac{[y_2 - y_1(w + V_t)]}{[x_1 y_2 - x_2 y_1]} \quad (6b)$$

2. Computation of Vertical Velocity

The w component is solved for by expanding the anelastic continuity equation given in Eq. 6. The finite difference form of the anelastic continuity equation can be written as $$\bar{\rho}_2(z) w_2 = \bar{\rho}_1(z) w_1 - (\bar{\rho}_{12} \nabla_2 \cdot \vec{V}_{1,2}) \Delta z \quad (10)$$

Given the four equations and four unknowns, the u, v and w components of the wind may be computed in a stepwise manner. The process begins at one boundary of the storm, where w is assumed to be 0. A zero vertical velocity is assumed at the tropopause because it is a very effective barrier to vertical motion.

The computation of the u, v and w wind components begins at the boundary where w is assumed to be zero and Vt is computed from Eq. (5). The u and v wind components are then computed using the relationship derived by Armijo (1969) and Brandes (1977a). Given the u, v and w components at the first level the divergence and vorticity are computed. Using a one-sided space difference, the vertical velocity at level 2 is computed from the anelastic continuity equation and the hydrostatic adiabatic density. Using the vertical velocity at level 2 computed from level 1 data, the horizontal winds, divergence and vorticity are computed for level 2. The synthesis of the u, v and w components proceed until the last level of the storm is reached. This process is repeated multiple times until the difference between iteration passes is less than a pre-determined number. The magnitude of the assigned vertical velocity at the top of the storm never exceeds 2 m s$^{-1}$. Although the integration from the top of the storm produces better results than upward integration, spurious divergence at the top of the storm can produce abnormally large vertical velocities near the ground. In order to reduce these problems, Ray et al. (1980) introduced a variational adjustment technique that reduces the problem of spurious divergences.

In summary, the three wind components in Cartesian coordinates may be obtained from the following four equations:

$$u = \frac{[R_1 y_s V_{r1} - R_2 y_n V_{r2}]}{[x_n y_s - x_s y_n]} - \frac{[y_s - y_x(w + V_t)]}{[x_n y_s - x_s y_n]} \quad (9)$$

$$v = \frac{[R_1 x_s V_{r1} - R_2 x_n V_{r2}]}{[y_n x_s - y_s x_n]} - \frac{[x_s - x_x(w + V_t)]}{[y_n x_s - y_s x_n]} \quad (8)$$

$$w_2 = \frac{\bar{\rho}_2(z)}{\bar{\rho}_1(z)} w_1 - \bar{\rho}_{1,2}(z) \nabla_2 \cdot \vec{V} \quad (11)$$

$$V_t = -4.32 Z_e^{0.052} \quad (5)$$

The adiabatic hydrostatic density can be computed by rearranging the first law of thermodynamics, which can be expressed as:

$$dQ = C_p dT_0 - \alpha_0 dP_0 \quad (12)$$

Where
 $a_0$=specific volume,
 $C_p$=specific heat at constant pressure,
 $dT_0$=an increment of temperature,
 $dP_0$=an increment of pressure
 $dQ$=amount of heat added or lost from the system.
 and the subscript 0 indicates the environmental state If we assume that the atmosphere is adiabatic and hydrostatic then and integrating the equation of state (12) may be written as:

$$\rho_{02} = \rho_{01} e^{\frac{-24.3207}{T_0}} \quad (13)$$

The density at the ground, $\rho_{00}$, is computed from the pressure and temperature at the ground obtained from a sounding launched from a sounding site near the base radar. The temperature at each analysis level was also obtained from this sounding.

In practice the computations start at the top of the storm where the vertical velocity is assumed to be zero. The terminal velocity is computed from Eq. (5) and the u and v wind components are computed from Eq. (8) and (9). This defines the three wind components at the first level. To complete the computations at this level, the vertical component of vorticity and divergence are computed. Equation (11) requires that the divergence and adiabatic hydrostatic density be known at both the current level and the next level at which the vertical velocity is to be computed for. The density at the next level is available from Eq. (13). However, the divergence is not. In order to compute the vertical velocity at the next level, the divergence and density at the current level are assumed to represent the mean divergence and density across the two layers. This is equivalent to using a one-sided space difference in the forward sense. As was indicated earlier, the derivative, although computationally stable, is noisier than it's centered difference counter-part. This implies that there is a larger error in the vertical velocities and that the vertical velocity may not be entirely consistent with the horizontal velocities. This may make the computation of the perturbation pressures more difficult, since the equations may no longer be elliptic and the solution will not converge. Once the vertical velocity at the next level is computed the horizontal velocities, horizontal divergence and vertical vorticity are computed. The vertical velocity at the next level is once again computed and the procedure moves stepwise down from the top of the storm. Once all the u, v and w wind components, the divergence and vorticity have been computed; the horizontal wind fields, vertical velocities and divergences are plotted and analyzed. These plots are then carefully examined, any remaining bad data are removed or corrected and the location and size of the updraft are determined. The program is then rerun with the corrected data set and the vertical velocity field at the top of the storm redefined.

3. Computation of Thermodynamic Parameters

The six basic equations common to meso-meteorology are used to derive the perturbation pressure, density, and virtual temperature fields from the dual-Doppler derived winds. A storm-relative coordinate system is absolutely necessary for the perturbation pressure computations to succeed. The anelastic approximation (Ogura and Phillips, 1962) is made to simplify the computations. The anelastic approximation requires only a hydrostatic adiabatic density that varies in the vertical only. The anelastic form of the momentum equations has the advantage of filtering out the high-speed small amplitude acoustic waves, but yet retains internal gravity waves. This is important in meso-scale meteorology, as it is the gravity waves, which feed on divergence, that are important, not the rotational meteorological waves. Starting with the anelastic momentum equation in tensorial form, we may write:

$$\frac{\partial}{\partial t}(\rho_{0a} u_i) + \frac{\partial}{\partial x_j}(\rho_{0a} u_i u_j) = -\frac{\partial P'}{\partial x_j} - \delta^{j3}(\rho' g) + \frac{\partial \tau_{ij}}{\partial x_j} + f_i \qquad (14)$$

Where
$u_i$=velocity in the ith direction: i.e. $u_1$=u, $u_2$=v,
$r_{0a}$=hydrostatic adiabatic density,
r'=perturbation density,
P'=perturbation pressure,
$f_i$=body forces other than gravity (i.e., coriolis force),
$t_{ij}$=turbulent momentum flux and
$d_{j3}$=Kronecker delta.

If we assume that the turbulent momentum fluxes can be neglected, Eq. (14) may be written in component form as $$\rho_{0a} \frac{du}{dt} + u\left(\rho_{0a} \nabla_3 \cdot \vec{V} + \vec{V} \cdot \overset{r}{\rho}_{0a}\right) = -\frac{\partial P'}{\partial x} + f_x \qquad (15a)$$

$$\rho_{0a} \frac{dv}{dt} + v\left(\rho_{0a} \nabla_3 \cdot \vec{V} + \vec{V} \cdot \overset{r}{\rho}_{0a}\right) = -\frac{\partial P'}{\partial y} + f_y \qquad (15b)$$

$$\rho_{0a} \frac{dw}{dt} + w\rho_{0a} \nabla_3 \cdot \vec{V} + \vec{V} \cdot \overset{r}{\rho}_{0a} = -\frac{\partial P'}{\partial z} + f_x - \rho_{0a} g \qquad (15c)$$

The anelastic continuity equation in vector form is $$\nabla_3 \cdot \left(\rho_{0a} \overset{t}{V}\right) = 0 \qquad (16)$$

Hence Eq. (15a-c) and (16) become $$\rho_{0a} \frac{du}{dt} = -\frac{\partial P'}{\partial x} + f_x \qquad (17a)$$

$$\rho_{0a} \frac{dv}{dt} = -\frac{\partial P'}{\partial y} + f_y \qquad (17b)$$

$$\rho_{0a} \frac{dw}{dt} = -\frac{\partial P'}{\partial z} + f_z - \rho_{0a} g \qquad (17c)$$

Note, that the wind components in Eq (17) are the total wind i.e., the storm motion and the winds relative to the storm. Using Fujita's (1963) time to space conversion and assuming a steady state storm we may write:

$$\rho_{0a} u_r \frac{\partial u_r}{\partial x} + \rho_{0a} v_r \frac{\partial u_r}{\partial y} + \rho_{0a} w \frac{\partial u_r}{\partial z} = -\frac{\partial P'}{\partial x} + f_x \qquad (18a)$$

$$\rho_{0a} u_r \frac{\partial v_r}{\partial x} + \rho_{0a} v_r \frac{\partial v_r}{\partial y} + \rho_{0a} w \frac{\partial v_r}{\partial z} = -\frac{\partial P'}{\partial y} + f_y \qquad (18b)$$

-continued $$\rho_{0a} u_r \frac{\partial w}{\partial x} + \rho_{0a} v_r \frac{\partial w}{\partial y} + \rho_{0a} w \frac{\partial w}{\partial z} = -\frac{\partial P'}{\partial z} + f_y - \rho_{0a} g \qquad (18c)$$

By assuming that the local derivative is zero, we have thrown an important term and one that may not be negligible. However, for now the local time tendency term is assumed to be zero in order to reduce the amount of data that need be processed and speed up processing. A study by Lin et al. (1990) showed that the importance of the local time tendency term was situation dependent and that could be dropped depending on the scan strategy and the character of the system being studied.

The generalized body forces expressed in Eq. (18) as $f_i$ are composed of those forces, which act on the parcels as a whole. Examples of these forces include the coriolis force and precipitation drag. In this study the precipitation drag forces are parameterized using the $Z_e$–$P_d$ relationship developed by Whiton (1977). This relationship may be expressed as:

$$P_d = \frac{1}{\rho_{0a}}(3.844 \times 10^{-5} Z_e^{0.549}) \qquad (19)$$

Combining all the term gives the final form of the equations used in this study $$\frac{\partial P'}{\partial x} = \rho_{0a} u_r \frac{\partial u_r}{\partial x} + \rho_{0a} v_r \frac{\partial u_r}{\partial x} + \rho_{0a} w_r \frac{\partial u_r}{\partial x} + \rho_{0a} f_1(c_y + v_r) - \rho_{0a} f_2 w \qquad (20a)$$

$$\frac{\partial P'}{\partial y} = \rho_{0a} u_r \frac{\partial v_r}{\partial x} + \rho_{0a} v_r \frac{\partial v_r}{\partial x} + \rho_{0a} w_r \frac{\partial v_r}{\partial x} + \rho_{0a} f_1(c_x + u_r) \qquad (20b)$$

$$\frac{\partial P'}{\partial z} = \qquad (20c)$$
$$-\rho_{0a} g + \rho_{0a} u_r \frac{\partial w}{\partial x} + \rho_{0a} v_r \frac{\partial w}{\partial x} + \rho_{0a} w \frac{\partial w}{\partial x} + \rho_{0a} f_2(c_x + u_r) + P_d$$

The left-hand side of Eqs. (7.46a) and (7.46b) contain only velocity and mean density terms which are known functions of position. The right hand side contains only one unknown P'. Thus we have two equations and one unknown. The solution in this case is over-determined. A solution exists, as shown by Gal-Chen (1978), in least squares sense only if:

$$\frac{\partial F}{\partial x} = \frac{\partial G}{\partial y} \qquad (21)$$

where $$F = \rho_{0a} u_r \frac{\partial u_r}{\partial x} + \rho_{0a} v_r \frac{\partial u_r}{\partial x} + \rho_{0a} w \frac{\partial u_r}{\partial x} + \rho_{0a} f_1(c_y + v_r) - \rho_{0a} f_2 w$$

$$G = \rho_{0a} u_r \frac{\partial v_r}{\partial x} + \rho_{0a} v_r \frac{\partial v_r}{\partial x} + \rho_{0a} w \frac{\partial v_r}{\partial x} + \rho_{0a} f_1(c_x + u_r)$$

Eqs. (20a) and (20b) may be combined to form a Poisson-type partial differential equation. Differentiating Eq. (7.46a) with respect to x and Eq. (7.46b) with respect to y and adding yields $$\frac{\partial^2 P'}{\partial x^2} + \frac{\partial^2 P'}{\partial y^2} = \frac{\partial F}{\partial x} + \frac{\partial G}{\partial y} \qquad (22)$$

This elliptic-type partial differential equation may be solved by the direct-method or via sequential relaxation with the appropriate boundary conditions. This study used sequential relaxation in order to simplify the calculations. Both homogeneous boundary conditions, i.e., $$P'=0; x \pm a \quad (23a)$$

$$P'=0; y \pm b \quad (23b)$$

and Neumann boundary conditions, i.e., $$\frac{\partial P'}{\partial x} = F; x \pm a \quad (24a)$$

$$\frac{\partial P'}{\partial y} = G; y \pm b \quad (24b)$$

can be use. Experiments comparing these two types of boundary conditions gave nearly identical results, except near the edges of the grid and along weak echo regions. In these areas the Neumann boundary conditions gave better results. Centered differences were used to compute $$\frac{\partial F}{\partial x} \text{ and } \frac{\partial G}{\partial y}$$

wherever possible. However along the edges of the grid and wherever there is missing data, one-sided differences were used, as necessary. This technique was found useful in computing the vertical velocities and horizontal divergences. Only small differences were noted between the results using one-sided differences along the edges and for missing data and those using centered differences. Further, since one-sided differences extend the region over which data were available, the small price of slightly noisier data made the additional programming effort worthwhile. The solution obtained by relaxing Eq. (23) is not a unique solution. If P'(x,y,z) is a solution then {P'(x,y,z)+c(z) is also a solution. In order to remove this constant the horizontal average of perturbation pressures <P'> is determined and subtracted from the perturbation pressure field. As Gal-Chen (1978) pointed out, the solution is then unique.

4. Perturbation Virtual Temperatures

In order to compute the perturbation virtual temperatures via the equation of state, the perturbation densities, r', are necessary. Perturbation densities may be computed from the third equation of motion, once the perturbation pressures are known. Recalling Eq. (7.46c), we may write:

$$\rho' = \frac{1}{g}\left[-\rho_{0a}g + \rho_{0a}u_r\frac{\partial w}{\partial x} + \right. \quad (25)$$

$$\left. \rho_{0a}v_r\frac{\partial w}{\partial x} + \rho_{0a}w\frac{\partial w}{\partial x} + \rho_{0a}f_2(c_x + u_r) + P_d + \frac{\partial P'}{\partial z}\right]$$

Defining H as $$H = \frac{\rho_{0a}}{g} \quad (26)$$

$$\left[-\rho_{0a}g + \rho_{0a}u_r\frac{\partial w}{\partial x} + \rho_{0a}v_r\frac{\partial w}{\partial x} + \rho_{0a}w\frac{\partial w}{\partial x} + \rho_{0a}f_2(c_x + u_r) + P_d\right]$$

Eq. (7.52) may be rewritten as $$\rho' = -\frac{1}{g}\frac{\partial P'}{\partial z} + H \quad (27)$$

As indicated earlier, the solution recovered from this equation is non-unique. A similar technique to that used in the perturbation pressure computations is used to make the solution unique. If the horizontal mean of H is taken and defining:

$$\rho'_u = \rho' - <\rho'>$$

$$P'_u = P' - <P'>$$

we may write Eq. (27) as:

$$\rho'_u = -\frac{1}{g}\frac{\partial P'}{\partial z} + (H - <H>) \quad (28)$$

Once the perturbation density fields have been computed, the perturbation virtual temperature may be computed from the equation of state in perturbation form. The equation of state in perturbation form may be written as:

$$T'_u = \left[\frac{P'_u}{P_0} - \frac{\rho'_u}{\rho_0}\right]\left[\frac{P_0}{R_d\rho_0}\right] \quad (29)$$

The perturbation densities and pressures just computed with the environmental values are used to compute the perturbation virtual temperatures. The perturbation virtual temperatures have been computed, because no attempt was made to extract the effects of liquid water from the computed temperatures. This makes the interpretation of the results more difficult since the regions of large liquid water content can change temperatures drastically. To remedy this difficulty, the fields of perturbation potential temperature q', similar to that used by Klemp and Wilhelmson (1978) and by Hane et al. (1981) can also be produced. It should be noted with care that the fields are perturbation virtual temperatures.

Single-Doppler Analysis

Under special circumstances, it is possible to recover the wind field using only one Doppler radar. Browning and Harrold (1970) used a single-Doppler radar to recover the winds in a mid-latitude cold front, and Wakimoto (1982) used a single-Doppler radar to recover the winds in a downburst during the NIMROD experiment. In each of these cases, the cross-beam component of the wind shear was assumed to be zero or small enough to be ignored when compared to the along-beam component in the anelastic continuity equation. Eliminating the cross-beam term reduces the number of unknowns to three; namely, 1) the radial velocity, 2) the vertical velocity and 3) the terminal velocity. As with the dual-Doppler case, the terminal velocity, $V_t$, can be recovered from the radar reflectivity via a Z–$V_t$ relationship and the vertical velocity can be calculated from the anelastic continuity equation.

The anelastic continuity equation in a cylindrical coordinate system (r,θ,z,t) with the origin at the radar site can be written as:

$$\frac{\partial(\rho_0 r V_r)}{r \partial r} + \frac{\partial(\rho_0 V_\theta)}{r \partial \theta} + \frac{\partial(\rho_0 w)}{\partial z} = 0 \qquad (29)$$

If we assume that the component in the tangential (θ) is small compared to the radial component $$\rho_0(z)\left[\frac{V_r}{r} + \frac{\partial V_r}{\partial r}\right] + \frac{\partial(\rho_0 w)}{\partial z} = 0 \qquad (30)$$

Assuming the elevation angles are small)(<20°) then the radial velocities and vertical velocities are independent and the vertical velocities can be found via downward integration of the anelastic continuity equation.

Figure 4:
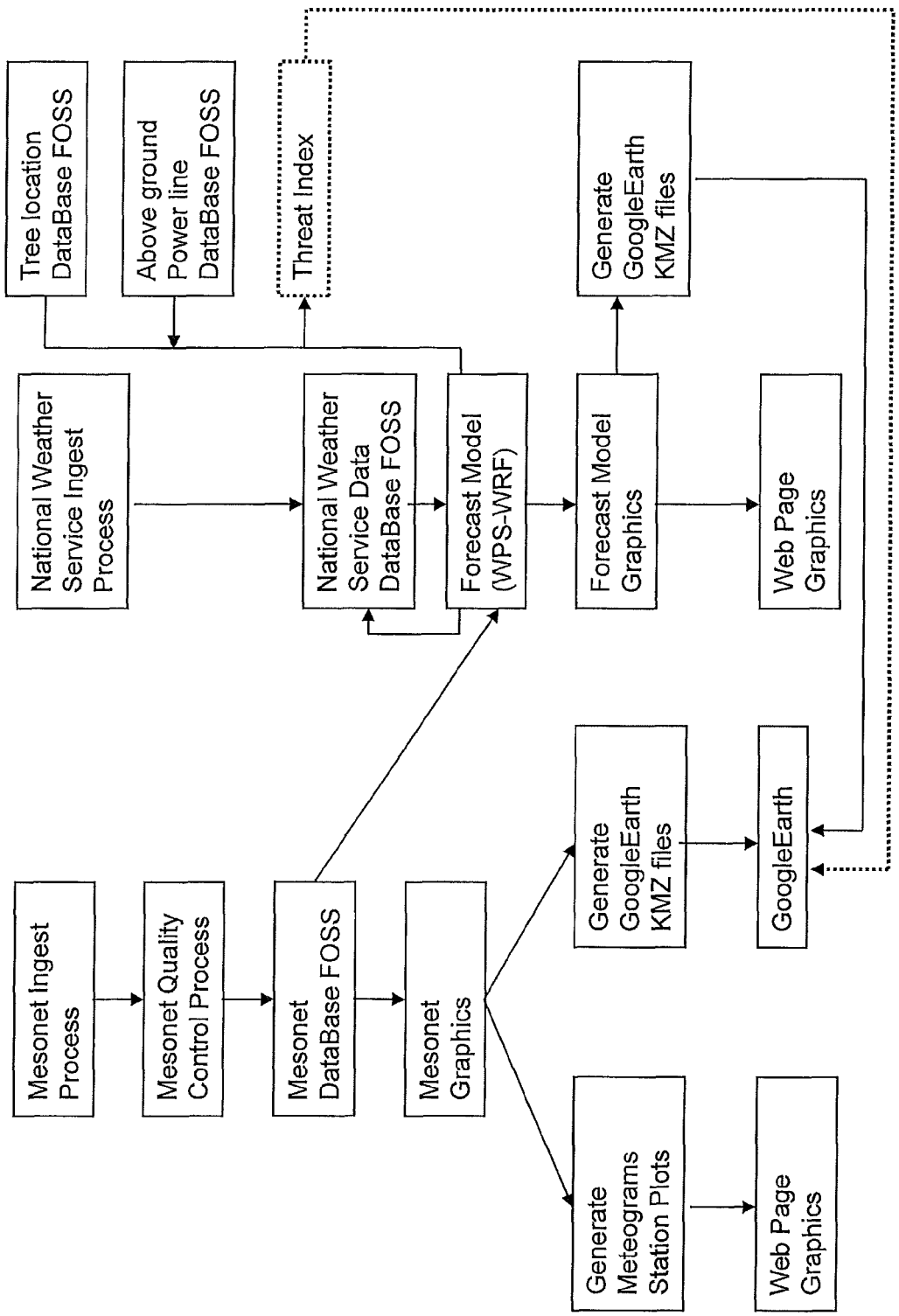
FIG. 4 is an over functional flow of the EAS process.
Figure 4A:
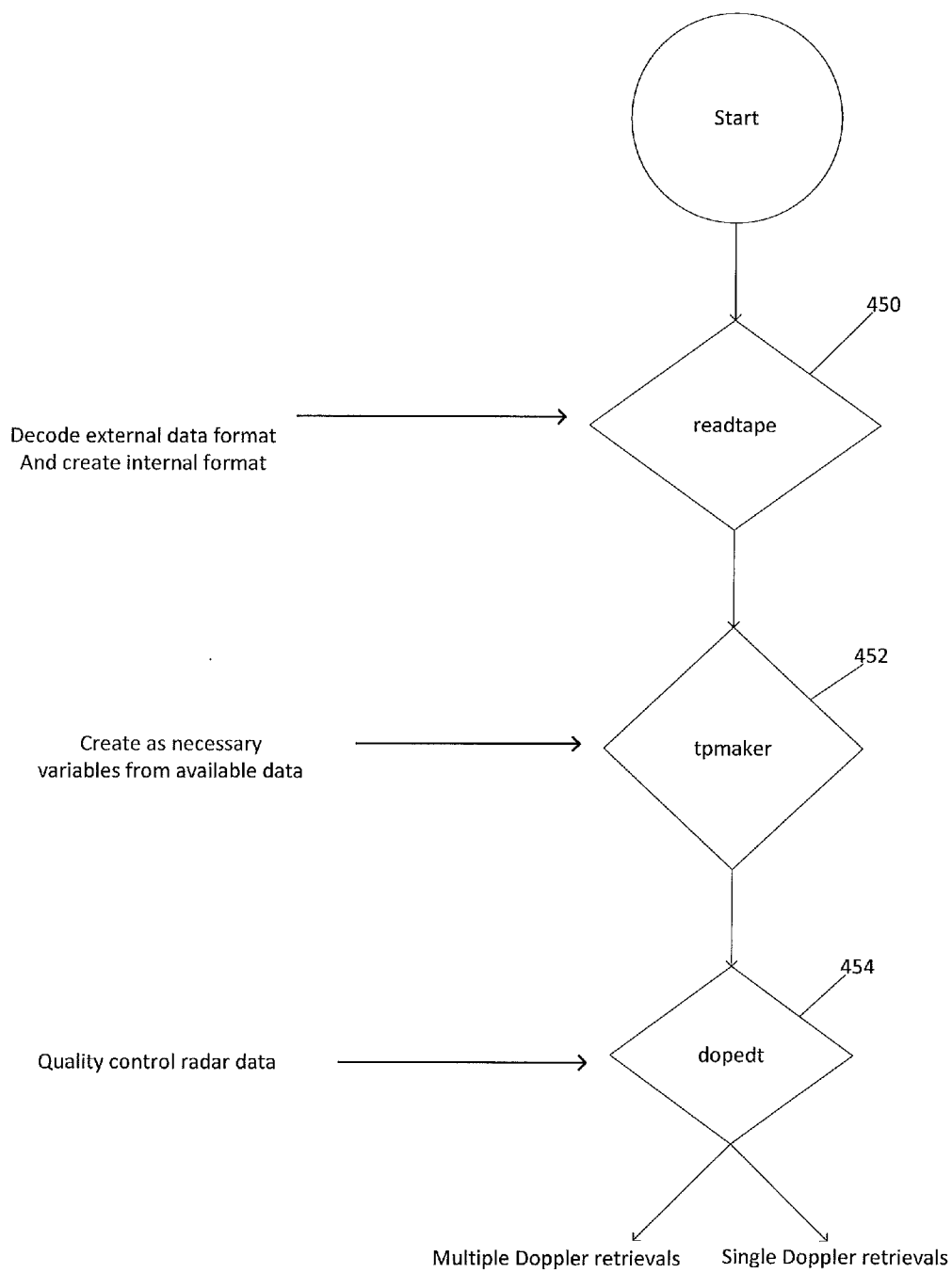
FIGS. 4A-4C, is an illustration of the DRAS process flow.
Figure 4B:
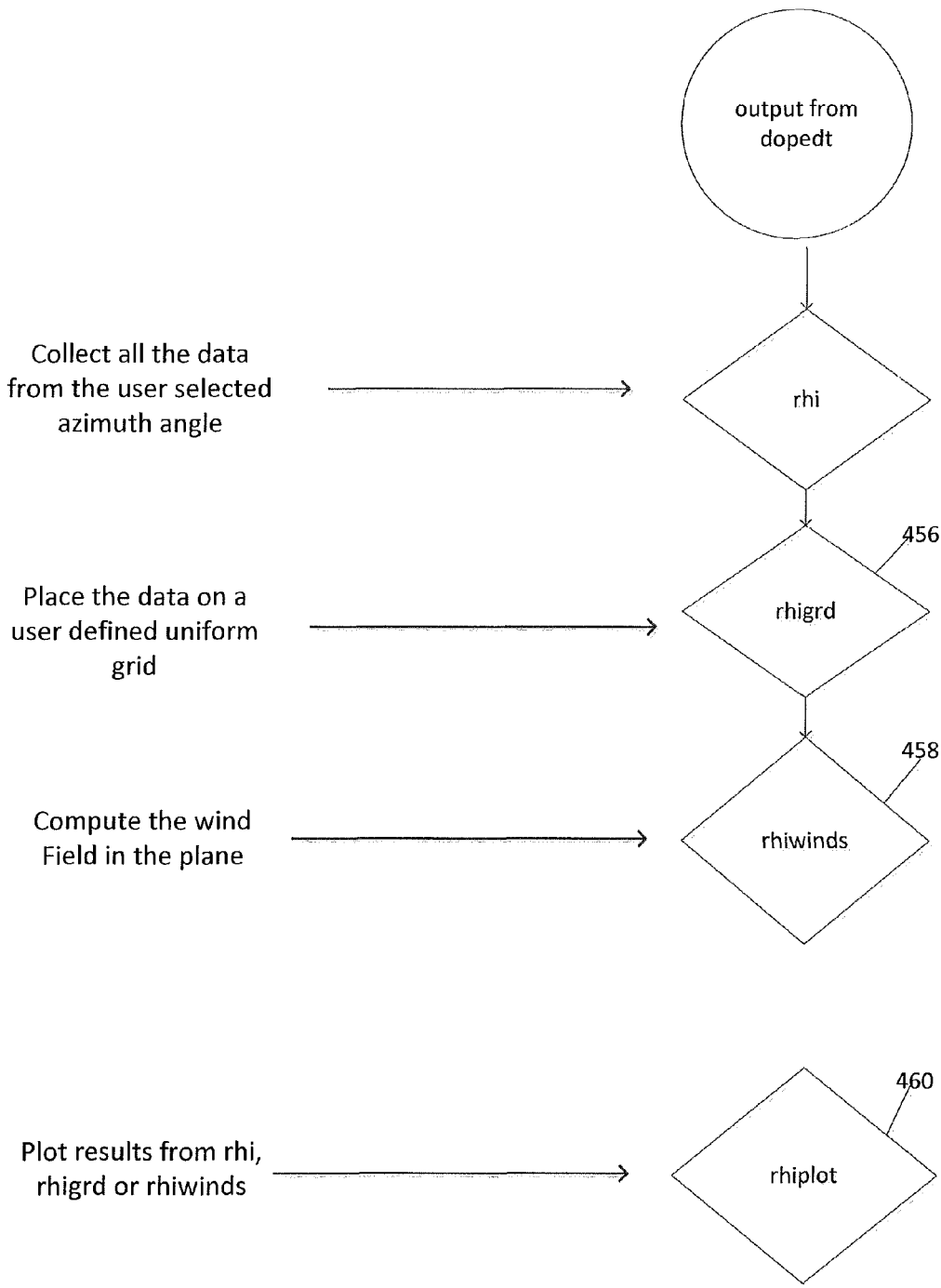
Figure 4C:
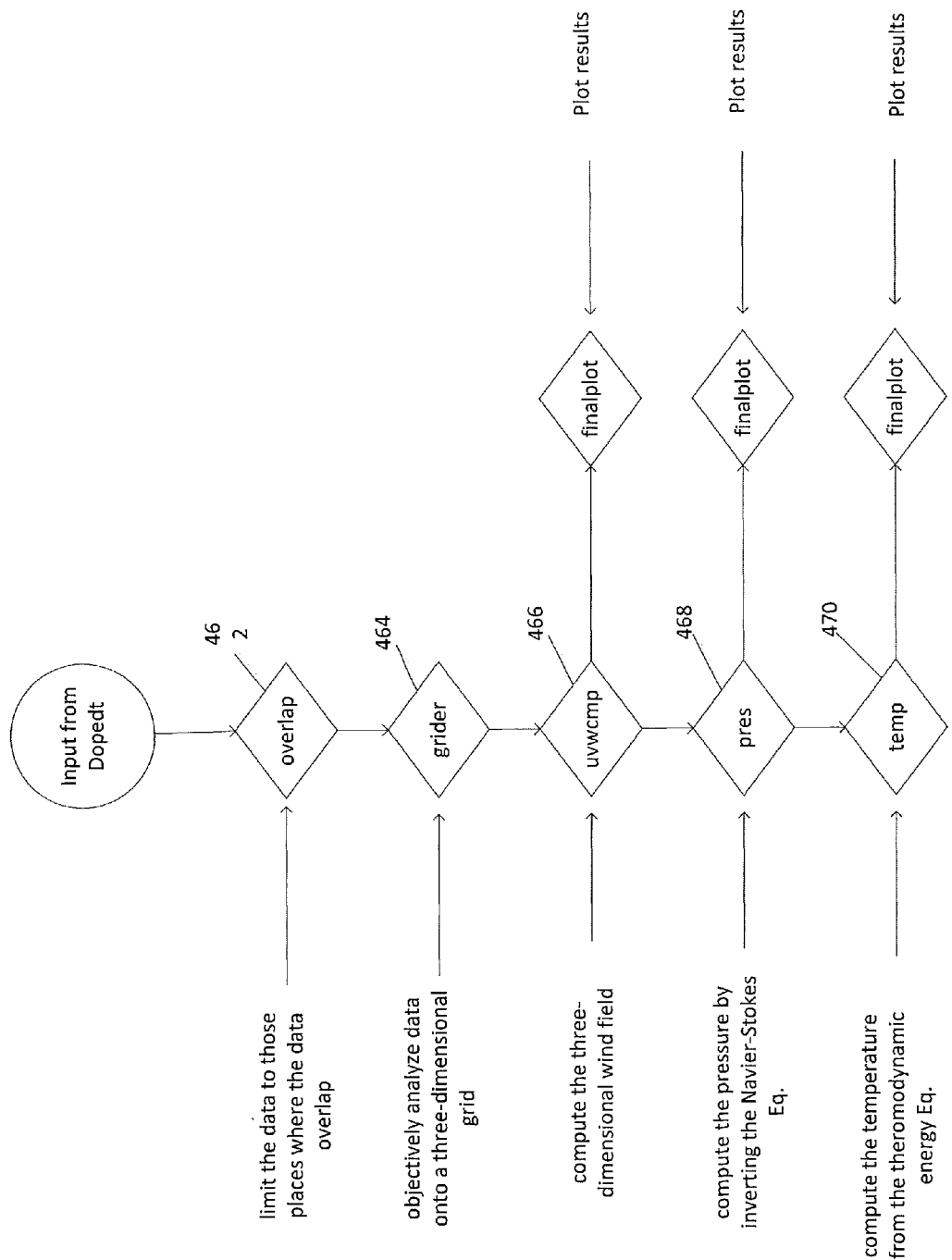

Referring to FIGS. 4A-4C, an illustration of the DRAS operational flow is provided. Determining the state of a numerical forecast model by performing Doppler radar observations and determining the difference between the numerical forecast model and the Doppler radar observations distributed in space and time. Determining initial and boundary conditions of the numerical model that minimize the difference between radar observation and corresponding variables forecasted by the numerical model. In addition, Doppler radar observations can be inserted into the numerical model. When the radial velocity is inserted, two other wind component can be adjusted with respect to the continuity equation. Then the pressure and temperature perturbation can be retrieved real time. The first step determines the state of the numerical model and the second step can be considered a correction procedure that forces the model variables to match observations. Performing quality control, editing and analysis techniques provide a more accurate three dimensional wind field recovered from the observed radial velocities and radar reflectivities. The DRAS implementation can compute realistic perturbation pressures and perturbation temperature fields and a measure of magnitude of errors in the recovered fields, and therefore can predict wind field changes and wind loading over a time duration.

For example, the DRAS system can utilize four radars to provide four independent samples from observing primarily four parameters (u-longitudinal velocity, v-lateral velocity, w-vertical velocity, and Vt-terminal velocity) from the radial velocities of a windfield. The three dimensional windfield can be determined in a stepwise manner where the horizontal winds are kept consistent between levels and the vertical velocity is consistent with the horizontal winds. The stepwise process can begin at one of the boundaries. The process can begin on the top boundary and performing a downward integration.

Continuous functions describing the state of the atmosphere are very rare in meteorology. Given that only discrete measurements are available, the finite difference forms of the equations cited above are required and hence all fields must be on a three-dimensional Cartesian grid. Radar data is collected in spherical coordinates with the origin at the radar. Thus, processing multiple Doppler radar data to create the three-dimensional wind, pressure and temperature fields involves converting data in spherical coordinates with two origins to a common Cartesian grid with an origin relative to the mesoscale features being studied. Further the data collected by the radars needs to be quality-controlled before they can be used. As noted above computing the three-dimensional wind field requires that divergence at each level be computed. The divergence, (the kinematic fields) requires only the first derivative of the radar radial velocities. Computing the pressure and temperature (the dynamic fields) requires the first and second derivatives of the kinematic fields. Because multiple derivatives of the radar radial velocities are involved the radar data used in the pressure and temperature inversions need to be of very high quality. Given that the radars used in a particular pressure and temperature inversion are rarely the same from experiment to experiment, the ability to read multiple Doppler radar formats is also required.

To provide a comprehensive, reliable and accurate Doppler radar processing system, Doppler Radar Analysis System (DRAS) is designed to take the raw Doppler radar data and create the three-dimensional wind, pressure and temperature fields in real-time.

Referring to the flow diagram, the compressed raw radial velocities and reflectivities can be decoded 452. The Doppler radars can have a signal processor as an integral component that generates a compressed data stream that is unique to the manufacturer and version of the signal processor. Thus DRAS, had a readtape module that is to decode this unique compressed data stream and convert it into an internal format. Since signal processors and compressed formats change rapidly, readtape can have a modular design that allows new data stream formats to be easily added or changed. Readtape decodes the datastream and insures that all the values needed to process the data are present.

The DRAS process insures that all variables needed are present 452. As noted earlier Doppler radars can come with a variety of signal processors and software revisions, in order to minimize the size of the datastream values that can be re-created from others in the data stream are often not included. As an example some radar processors do not provide the horizontal range to the target merely a radar gate number. Given the speed of light and the gate number the range to the target can be compute. Given the range to the target and the elevation angle the horizontal range to the target can be computed. Thus, the tpmaker module can create if necessary all the values needed for further analysis.

Quality-control standards can be applied to the raw Doppler data 454. As noted above the quality of the data used in the pressure and temperature inversions is extremely important. The DRAS program module dopedt is responsible for insuring that poor quality data signified by low radar reflectivities and/or large spectrum widths are removed from the data set. Dopedt is written to allow flexibility in choosing the appropriate minimum allowable radar reflectivity and maximum allowable spectrum width. The choice of values is crucial to a successful pressure and temperature inversion and is strongly dependent of the characteristics of the radar and the system being observed. In addition, dopedt performs velocity unfolding again using a use specified maximum allowable gate-to-gate divergence. As with the minimum reflectivity and maximum spectrum width the maximum allowable gate-to-gate divergence is dependent on the system being analyzed and the radar characteristics. Dopedt allows flexibility in choosing appropriate values to remove all velocity folding from the datastream.

The DRAS process determines where in space the two Doppler lobes intersect in space via overlap. Each Doppler radar has a region over which radial velocities and reflectivities are available. In order to perform a multiple Doppler analysis the angle between the two radar beams needs to be as close to 90° as possible. When siting the two radars, careful attention needs to be paid to predominate location of the systems to be analyzed, insuring that these regions are within the two lobes formed by the two radars. Given the radar characteristics and the system to be analyzed, the horizontal and vertical grid spacing, and grid location are determined by the analyst 456. The datastream from each of the radars is converted from spherical coordinates to Cartesian coordinates with the radar as the origin. One of the radars is chosen to be the base radar and all the data from the other radars are translated to the base radar. Once all the data has been translated to a common origin the data is sorted such that each data point has a nearby data point from all the other radars. This insures that when the data is placed on a rectangular Cartesian grid each grid point has enough data to perform the wind computations and pressure and temperature inversions 458 and 460.

One implementation performs an objective analysis on the data retained by overlap 462. Grider 464 processes all the data created by overlap into a three-dimensional volume of reflectivities and radial velocities from all the radars. The data retained by overlap is not on a regular Cartesian grid; rather it retains the spacing and orientation from the spherical coordinates it was collected in. Further the data contains information at wavelengths that may not be resolvable given the grid spacing chosen. To move the data to a Cartesian grid in an objective manner and to remove wavelengths not resolvable on the grid a Barnes (1993) objective analysis technique is used. A Barnes objective analysis determines a priori the amplitudes of the wavelengths recovered by the analysis. Nyquist sampling theory states that a minimum of three samples per wave is satisfactory for recovering the characteristics of a wave; a more stringent requirement of five samples per wave is used for the Barnes objective analysis.

At this point the three-dimensional wind field can be computed via Eqs 5, 8, 9 and 11 via uvwcmp 466, the sixth stage in the process. Centered finite differences are used through out the volume except along the edges of the domain and in areas where there is missing data where one-sided differences are used. Error tolerances for the vertical integration, subsetting of the domain, and the type of variational adjustment are all adjustable based on the quality of the data used. In addition to computing the three-dimensional wind field a complete kinematic analysis of the system is performed. Plots of the wind and kinematic fields are available via finalplot.

Given an accurate three-dimensional wind field a pressure inversion using Eq 22 via pres is conducted 468 as stage 7. As with uvwcmp error tolerances are adjustable and centered finite differences are used through out the volume except along the edges of the domain and in areas where there is missing data where one-sided differences are used. A measure of the quality of the pressure inversion at each level is also computed. As with uvwcmp plots of the wind, kinematic and pressures fields are available via finalplot.

Given a pressure inversion with minimal error, a temperature inversion via Eq. 26 can be conducted via temp 470 as stage 8. Temp has the same overall structure and options as pres. As with uvwcmp and pres plots of the wind, kinematic, pressures and temperature fields are available via finalplot.

Referring to FIG. 4, an illustration of an EAS operational flow is provided. The operational flow has three primary functional flows. The EAS process begins with ingest of data from two different data streams. The first data stream is the observations and global model forecast data. The second data stream is the observations from the EAS process Mesonet. The data stream from the National Oceanic and Atmospheric Administration consists of observations of the three-dimensional structure of the atmosphere and large-scale forecasts from numerical weather prediction model run by the National Weather Service. However, not only are the stations from the National Weather Service irregularly spaced, they are also not strategically space for the local mesonet. Therefore, EAS transforms the information in an objective fashion onto the individual grids. There is an objective analysis method that is used to perform this function. There is a method that is utilized by the EAS system that can generally be referred to as the ObsGRID function that transforms all of the information from an irregularly spaced network of stations and imports the information on uniform cubical grids in a fashion that is sufficiently accurate for the necessary predictions. A Nyquist sampling technique can be utilized, which can be used along with a Barnes and/or Cressman sampling technique. This transformation is necessary for the ingest process. From these functional flows a threat index can be developed.

There is also a user interface flow. The user interface flow allows the user to intercede and modify the operation of the EAS process. For example a user through the user interface can modify or eliminate faulty input data or forecasts and fine-tune the threat index. Also the user can input through the user interface additional parameterized information such as the content of a chemical involved in a chemical spill. The user may also make modifications due to known climatologically induced conditions that may have an effect on prediction capability and parameterization schemes.

In order to insure that only correct data from the Mesonet are incorporated into the EAS process, data from the Mesonet stations is carefully examined. The data from each station is checked to insure that the values are within realistic ranges (level 1 check). The data is then compared against values for the same station for previous times (level 2 check) to insure that a single miss-transmission of data has not occurred. The data is then compared with data from nearby stations to insure that several miss-transmissions or contaminated data have not occurred. The Mesonet ingest function then stores the data from the Mesonet into a database for later retrieval by other parts of the EAS process.

The National Weather Ingest function imports observations and global scale numerical weather forecasts from the National Oceanographic an Atmospheric Administration and stores the information in a database for formulation of the forecast model.

The EAS process also utilizes various databases containing information related to the natural environment such as terrain, land use, soil moisture, soil temperature and trees to create the high spatial and temporal resolution weather forecast. The EAS process also utilizes various databases containing information related to infrastructure and critical facilities such as overhead power lines, electrical utility substations, schools and hospitals. The combination of the high spatial and temporal resolution forecast and the various databases relating to infrastructure and critical facilities gives the EAS process the ability to create threat indicators that can assist logistical managers within the utility industry, emergency response industry, or other government agencies in the allocation of resources and manpower. The localized weather prediction having maximized temporal and spatial resolution combined with other information can allow for example a utility industry logistical manager to allocate resources in localized areas where icing is forecasted and trees are located adjacent power lines. The high resolution from the Mesonet combined with weather prediction models (WRF), allows for the prediction models to be more effectively tuned, due to the local maximized spatial and temporal data provided by the Mesonet, to fit the local conditions.

This is accomplished by choosing from the many possible choices of parameterization schemes based on the Mesonet data where those parameterizations schemes are such that when they are combined with WRF can provide the best possible localized forecast. The present invention determines which combinations of parameterization schemes produce the highest spatial and temporal correlation factors for the application, for maximizing spatial and temporal resolution and for the region. This is accomplished by utilizing the forecasted weather conditions and observed weather conditions from the real time localized sensors of the Mesonet. Weather forecast maps, graphics and threat indexes can be produced and provided to a logistical manager for allocating resources and manpower.

EAS can also provide a threat index for an event that is designed to identify problem areas of interest that merits action or a closer watch. The threat index level can be determined by considering a combination of three factors including 1.) the type of asset; 2.) weather conditions that can potentially place the asset at risk; and 3.) special conditions in the area that can potentially amplify the threat. In the case of an electrical utility, the asset could be power lines or high tension towers. The weather conditions could be icing or high winds. The special conditions could be trees hanging over the power lines. The threat index could be a level rating of 0 to 100 where 100 is the highest threat level. EAS determines at what geographic locations and what predicted times will all three of those conditions exist and attach to that a number.

Given a high spatial and temporal resolution meteorological forecast is made, the system combines the weather predictions with infrastructure data and/or natural environment data of the area to create a threat level index and a graphical map presentation of any threats. As will be understood by one skilled in the art, certain weather conditions combined with certain types of infrastructure can create emergency conditions. The threat level index is a probabilistic tool that rates areas in which certain infrastructure is likely to encounter certain, possibly hazardous conditions, and/or outages, which can result in a high probability of danger and/or service outage periods.

For example, in one embodiment of the present invention, the predictive indicator system provides a threat level index for a weather event to an municipal electric utility company. Infrastructure data including the location of above-ground power lines and trees can be infrastructure and natural inputs into the system. The system can then analyze the likelihood that winds over a certain speed will occur and/or that icing will occur in an area where both above-ground power lines and trees are present. Where it is determined that all three of these factors are likely to overlap, a high threat level is assigned. Thus, an Emergency Management Center of an electric company can be notified and therefore, be able to decide where and when to martial manpower before the crisis or outage arises.

Figure 5:
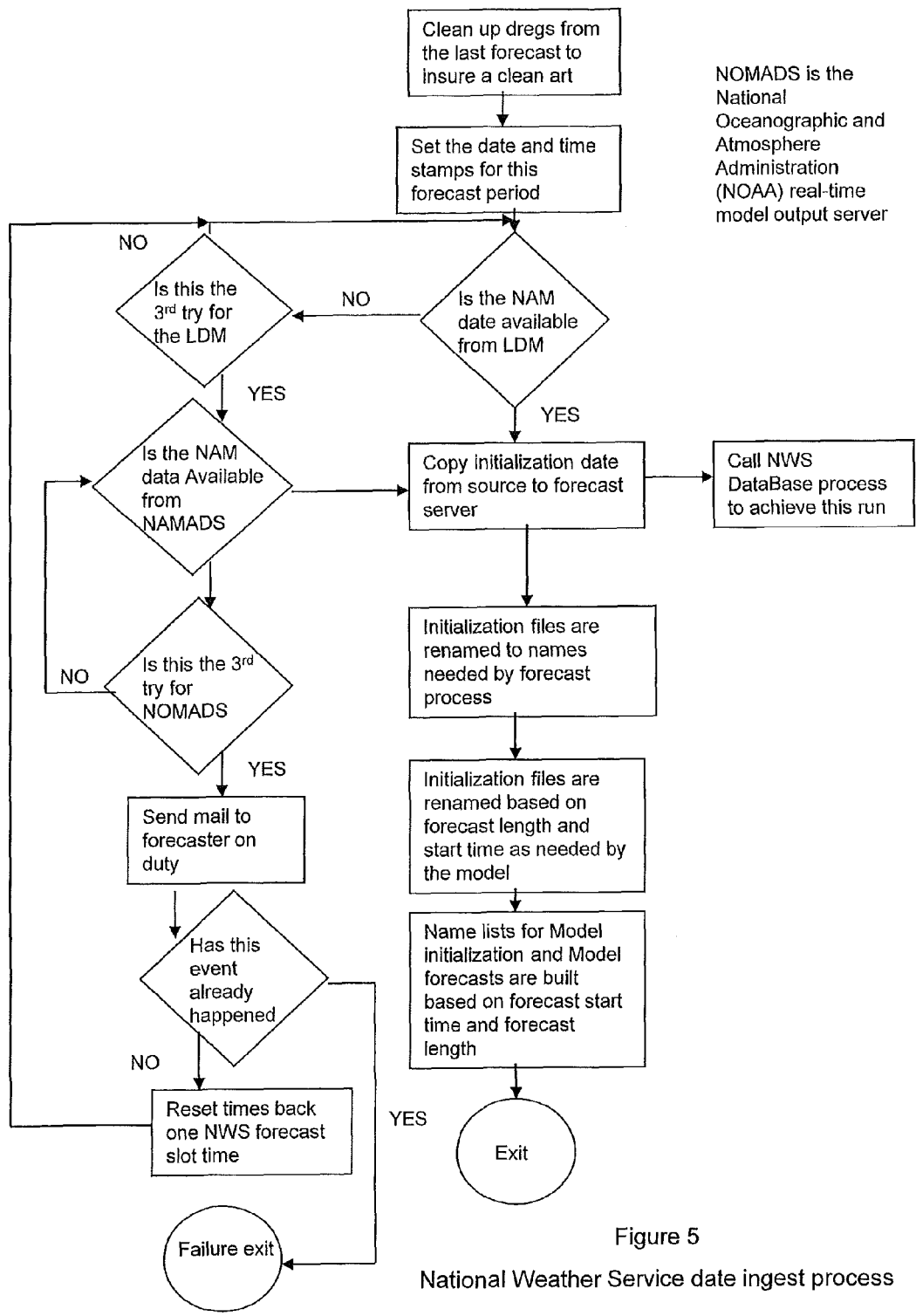
FIG. 5 is a functional flow of the National Weather Service Data Ingest Process.

Referring to FIG. 5, an illustration of the NWS data ingest process is provided. The National Weather Service (NWS) ingest process is designed to obtain the necessary observations and global-scale numerical weather forecasts from the National Weather Service. The NWS ingest process begins by removing any files from previous runs of the NWS ingest process and determining the date and time of the data to be ingested. The NWS ingest process then attempts to obtain the necessary global model forecast data to initialize the local model. The NWS ingest process makes threes attempts to obtain the global model forecast data from the local source of NWS data (the Local Data Manager: LDM in FIG. 5). If three unsuccessful attempts are made to obtain the global models forecast data locally, the NWS ingest process sends mail to the forecaster on duty notifying them and the failure and then makes three attempts to obtain the global model data directly from the National Weather Service servers. If this fails the NWS ingest process again notifies the forecaster on duty and resets the date and time to obtain an earlier run of the global model forecasts data. If this process fails once the NWS process exits and notifies all forecasters of the failure. Given the global model forecast data the NWS ingest process creates the necessary Mesoscale model boundary conditions naming the files with the date and time of the initializations. The global model forecast data, boundary conditions and files with the correct parameterization schemes are passed to the Mesoscale forecast model and to a database where the information is stored for other processes. Parameterization schemes are typically region and application dependent—the correct parameterization schemes for a region in the Midwest, such as for example Missouri, would be different from a coastal region, such as for example California, due to the different general weather conditions experienced in such disparate regions.

Figure 6:
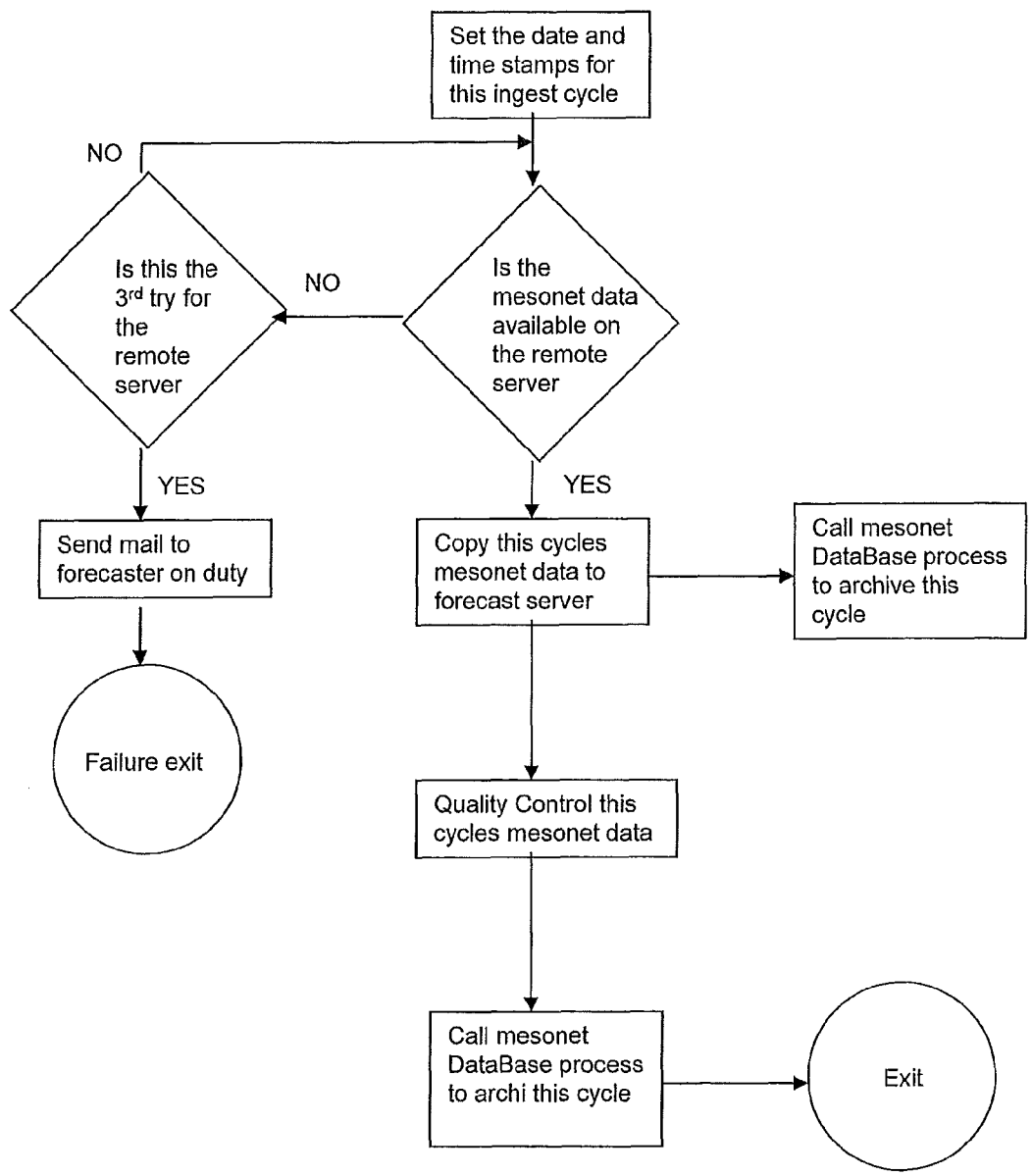
FIG. 6 is a functional flow of the Mesonet Data Ingest Process.

Referring to FIG. 6, a functional flow of the Mesonet Data Ingest Process is illustrated. As noted in paragraphs 40 and 41 above the data from each of the sensor arrays are strategically placed based on regional characteristics to maximize the spatial and temporal resolution for the specific application. Further these sensor arrays are can be connected to a commonly used utility industry network called SCADA. Other networks can be utilized without departing from the scope of the present Invention. Thus the data from the SCADA network is first collected at a SCADA central site where the data from all the sensors are collected and sorted by time. The collected and sorted data from the sensors are then forwarded to EAS process central site. At user selectable intervals the Mesonet ingest process contacts the SCADA central site to determine what data is available. If the requested data is available it transferred from the SCADA central site to the EAS process central site. If not, then three attempts are made to request the data from the SCADA central site. If after three attempts the requested data is not available email is sent to the forecaster on duty warning of the failure. If the data is available, the raw Mesonet data is stored in a database and the Mesonet quality control program is forked from the Mesonet ingest process. Once the Mesonet quality control program returns the quality controlled data and the quality control flags are stored as a second entry in the Mesonet data database for each date time stamp and station. Each ingest cycle is assigned a date and time stamp so that near real time data can be utilized along with the most recent trends and transitions.

Referring to FIG. 7a, a functional flow of the Mesonet Quality Control Process is provided. As with other components of the EAS process, the Mesonet quality control process begins by obtaining the date and time of the Mesonet data that is to be quality controlled. The data from a SCADA central site can optionally not have important information, such as information regarding the latitude, longitude and height above sea level of a sensor, attached to the data transmitted from the sensor in order to minimize the amount of information transmitted from each sensor package. In that case, the data from a sensor station preferably contains the "name" of the sensor station and the weather data recorded by that sensor, allowing the EAS system to then determine the omitted information from a lookup table of sensor station names correlated with such latitude, longitude and height above sea level data. Once a match is found the data record has the appropriate information attached.

Figure 7:
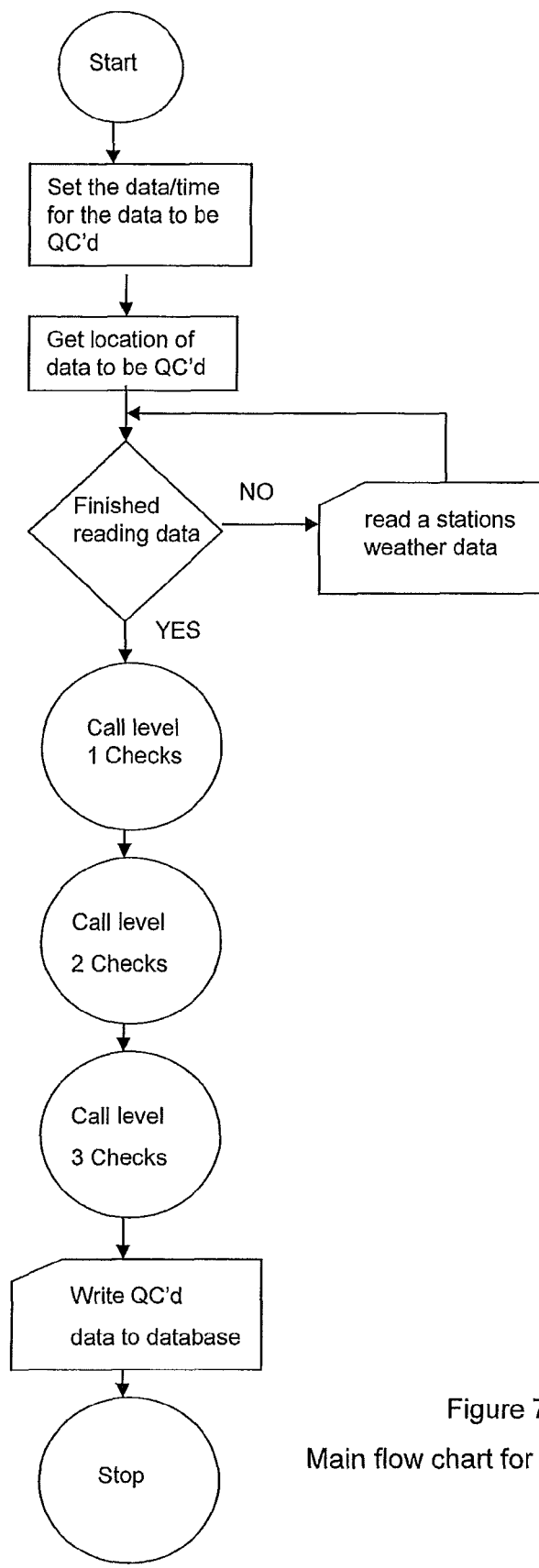
FIG. 7 is a functional flow of the Mesonet Quality Control Process
Figure 7B:
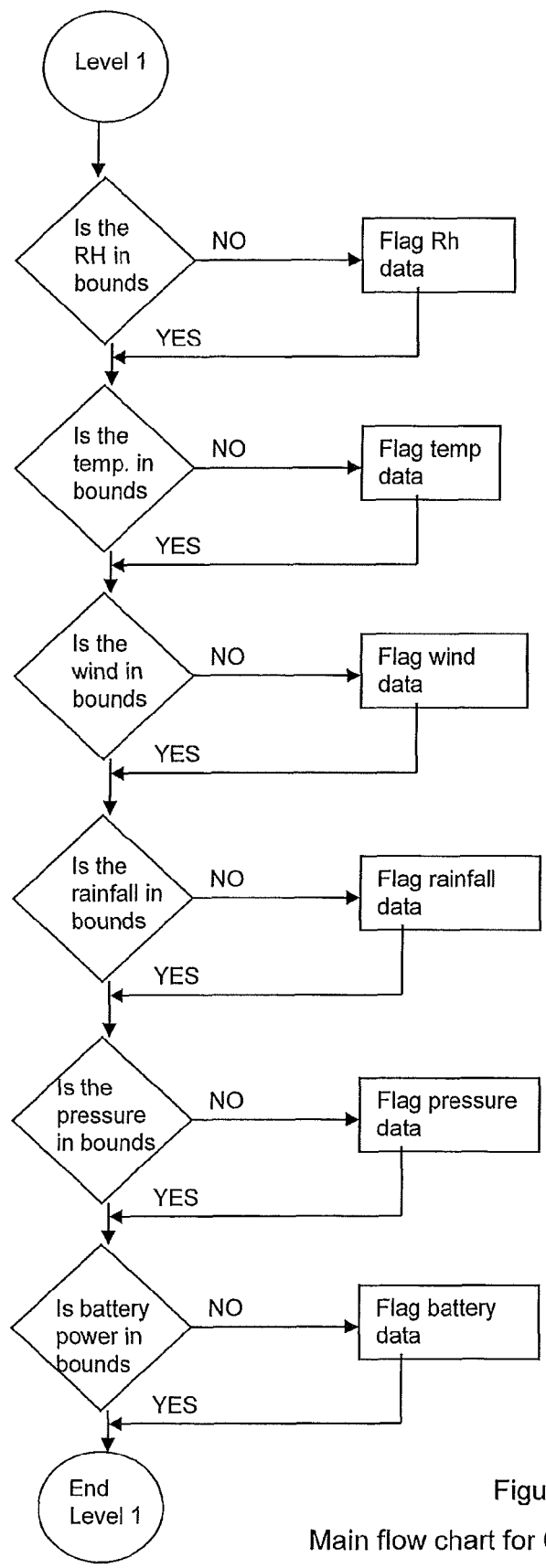

Referring to FIG. 7b, the first step in the Mesonet quality control process is to check the data from each station to insure that the values are within realistic ranges. This is referred to in FIG. 7a as a level 1 check. The ranges of realistic values are based on both the season and typical values suggested by the National Weather Service. Values that are out of bounds are flagged as bad data by setting the flag to the amount the value was above or below the acceptable ranges.

Figure 7C:
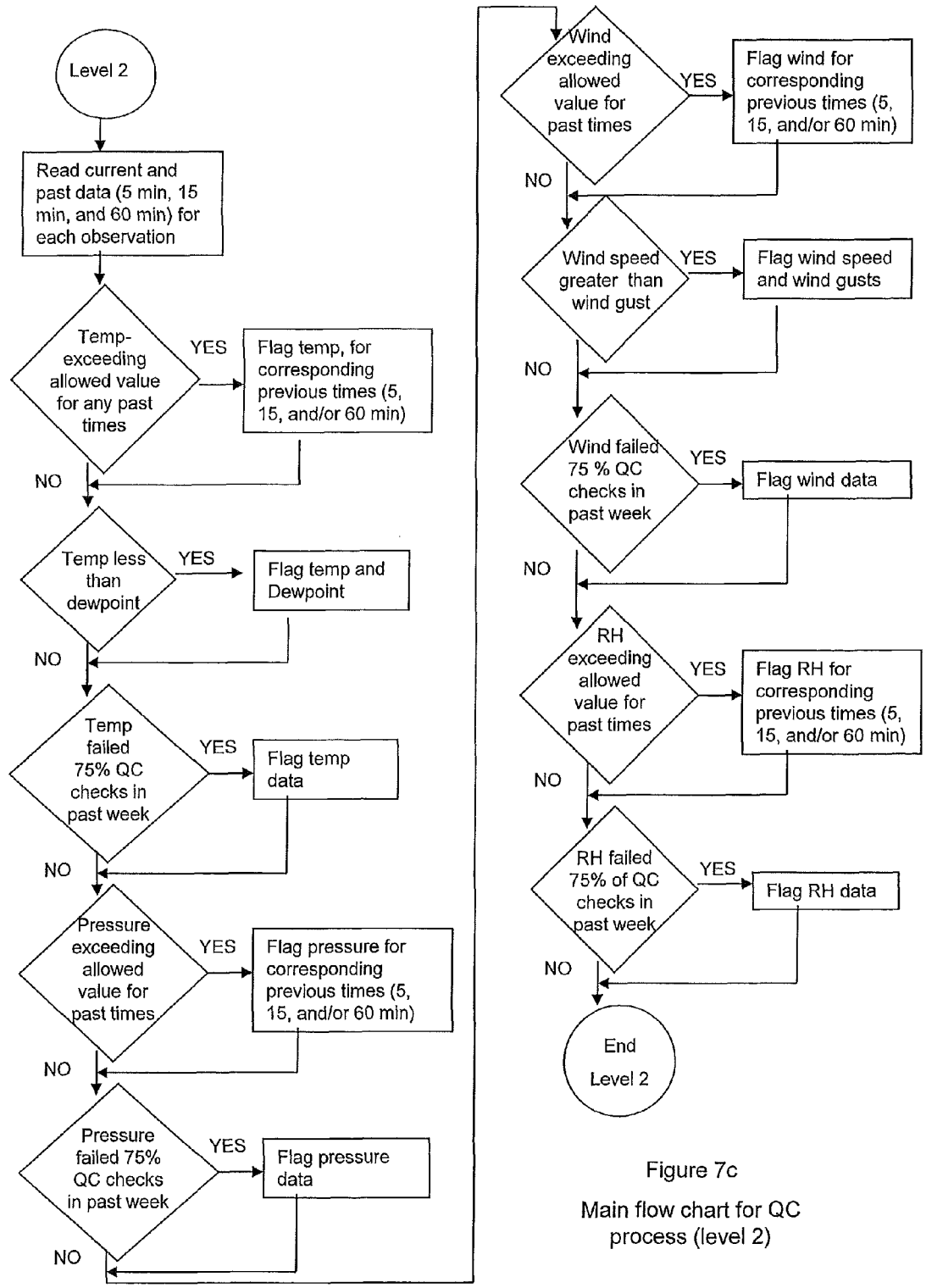

Referring to FIG. 7c, the next step in the Mesonet Quality control process is a check for temporal continuity. If this station's data has failed a level 1 check, then a level 2 check of this station's data is not conducted. In order to conduct a temporal continuity check, the data from each station is compared to values for the same station in 1 minute, 5 minute, 15 minute and 60 minute increments in the past to insure that a single miss-transmission of data has not occurred. This is referred to as a level 2 quality control check in FIG. 7a. As with a level 1 check, if bad data is determined, it is flagged by setting the bad data flag to the amount of error found in the data.

Figure 7D:
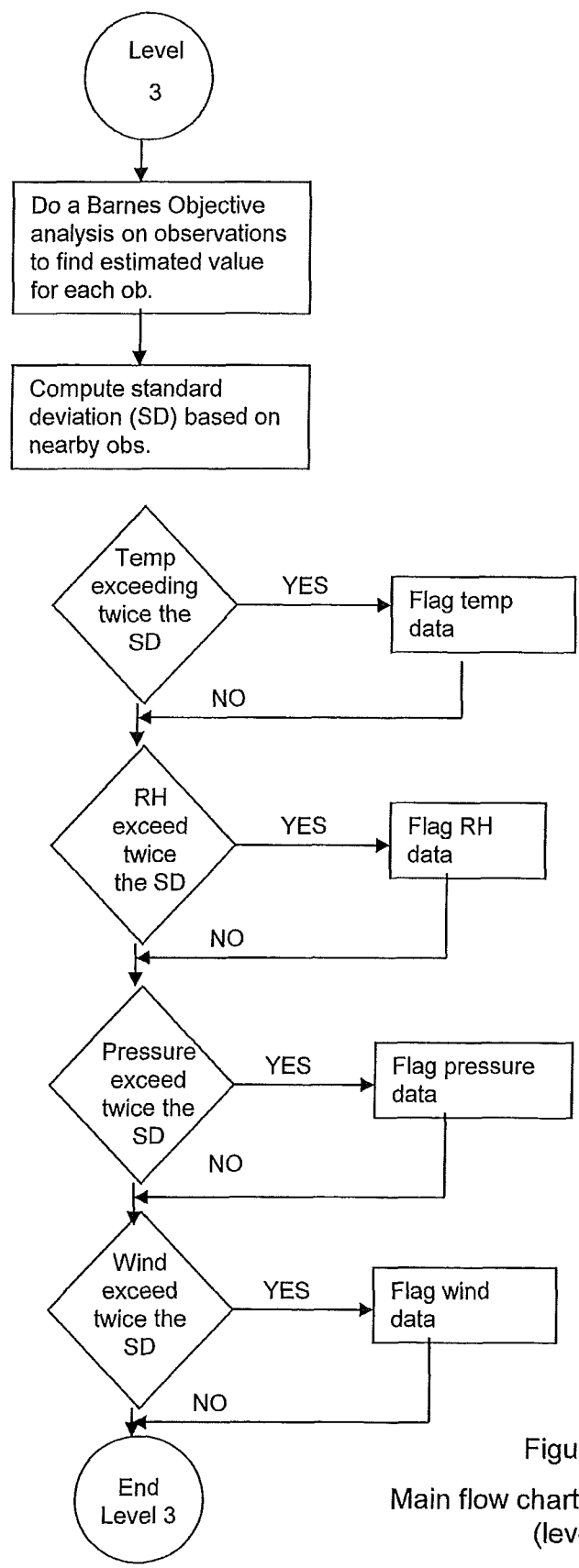

Referring to FIG. 7d, the next step in the Mesonet quality control process is to test a station's data is representative. In this case each stations data is compared to its neighbors' to determine a stations data is significantly different than near by stations. If this stations data has failed a level 2 check, a level 3 check of this stations data is not conducted. This check is performed by removing each station in turn from the list of stations reporting. A Barnes objective analysis is then computed with the restricted data set. A bi-linear interpolation of the gridded data to the location of the station removed and the values from the interpolation is compared to the actual data at the station. If the station is truly representative of the weather there will only be a small difference between the interpolated data and the actual data. This is referred to as a level 3 check. As with the level 1 and level 2 checks any stations with errors are flagged with the amount of error found in the stations data.

Figure 8:
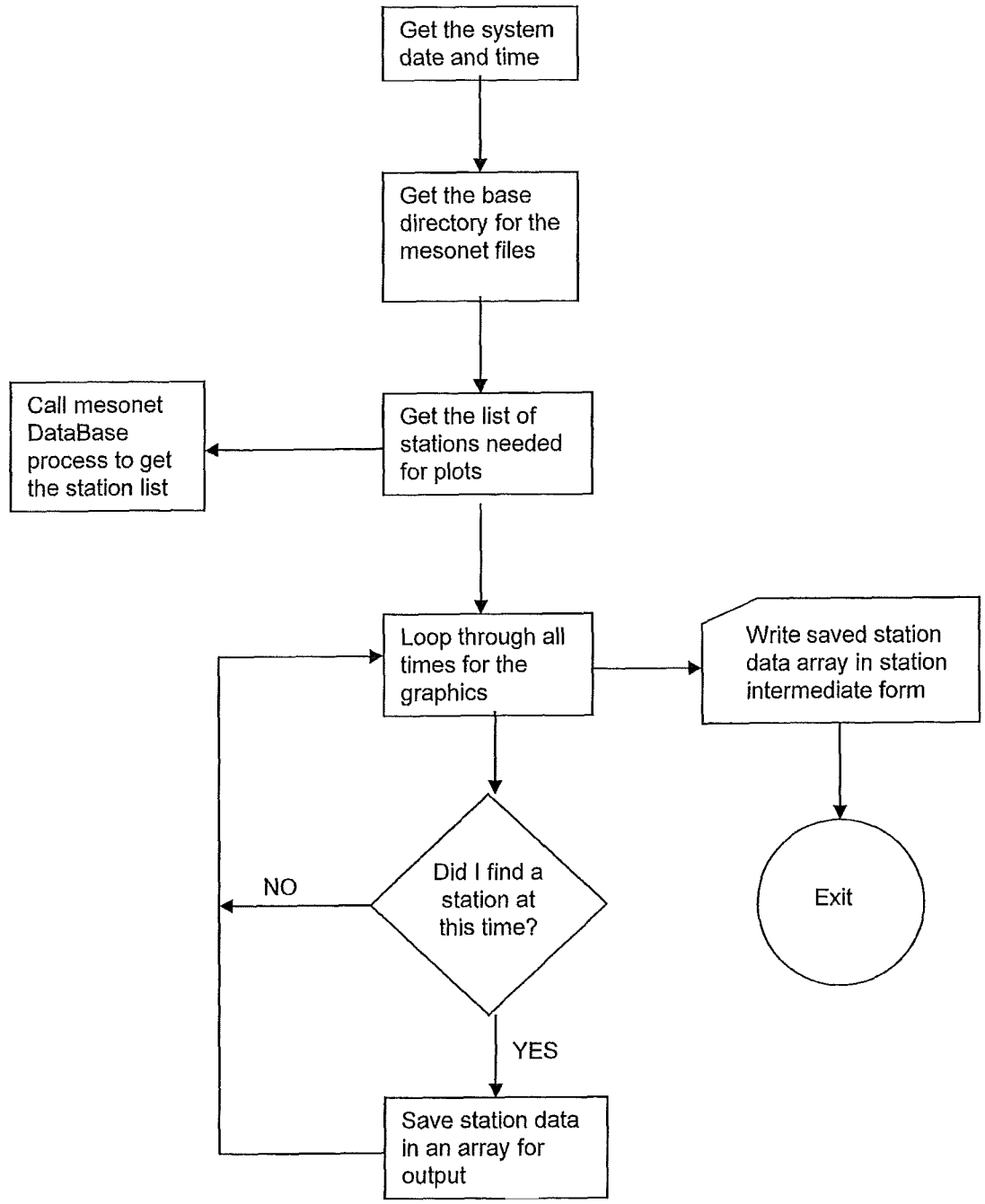
FIG. 8 is a functional flow of the Mesonet Graphics pre-processor.

Referring to FIG. 8, a functional flow of the Mesonet Graphics pre-processor is provided. The advantage that the Mesonet data provides is the monitoring of the weather conditions at locations spaced closer together than prior art monitoring stations. The greater number of sensors spread over a smaller area provides a higher spatial and temporal resolution of the existing weather and allows the Mesoscale model to start with a more accurate set of boundary conditions. So part of the solution provided by EAS to the question of how big the domain is and how to place stations is very dependent on the particular problem that is trying to be solved. It is a time problem in the sense of how much is needed. It is also a spatial problem because EAS must determine how much spatial coverage is needed or how far to go back to get enough upwind or upstream data. So, the placement of the sensor stations for EAS is dependent in space and time on how much lead time is needed. There is a spatial and temporal resolution. The location of assets of concern is also a driver for placement of the sensor stations. Further, unique natural or land-use or infrastructure conditions can be a driver as well as known prediction problems. EAS has an optimization scheme to address the various needs. However, an increase in the number of sensor stations forming a local mesonet is not all that EAS provides. The EAS system's strategic placement of sensor stations is also provided.

Strategic placement of a sensor station for the local mesonet can be determined by considering three primary parameters and they are—1.) the type of weather threat/event of concern; 2.) the type and location of the asset that is potentially threatened; 3.) extraneous unique local conditions that may render an otherwise predictable environment unpredictable or magnify the threat level of the weather threat/event even when the weather threat/event would have normally been a non-event. Item 1.), though considered, can be rendered of little or no effect if each sensor station placed has the entire suite of sensor types and the sensor station is optimally placed such that each sensor type will get a good reading. The stations also can have the ability to sample in the vertical. However, placement of a station for optimal reading of all sensor types will be overridden if the asset of concern is most threatened by a particular type of weather threat/event such that placement is skewed toward a placement that provides best sensing capability for that particular type of weather threat/event that the asset is most endangered by.

For example, a power line may be most threatened by icing or high winds. Therefore, the most heavily weighted parameter can likely be the type and location of the asset that is potentially threatened. Placement of sensor stations are made to provide the best coverage for the assets of concern and placement of stations are skewed toward a placement that allows for best sensing of a weather threat/event of most concern. Item three can be natural or man made obstructions or objects or climatologically induced conditions that hinder normal predictive capabilities or that can increase the threat level above what it would otherwise normally be. For example, a building may hinder an accurate reading of wind conditions. Traditional placement of sensor stations have typically resulted in placement of sensor station in and around major airports because of there typical proximate to large metropolitan areas. If it is decided to install an EAS system in an region, then sensor stations can be installed strategically at various locations as dictated by the above parameters in order to form a local mesonet network, which provides coverage for the assets of concern in the region. The local mesonet can be implemented and layered in combination with other available data as discussed above.

There also may be areas of interest were EAS has determined an effective parameterization scheme in a particular region is not feasible thus actual data is needed thus driving the placement of sensor stations in the local mesonet. EAS is designed with locations to fill in gaps where information is needed to have an answer to or description of conditions so that EAS can report what is actually happening on a regular basis based on what is seen across the network in terms of how much longer, for example the icing event, is going to continue and how heavy the icing was going to be and how fast is it accumulating. The EAS system also allows for user input to make adjustments just based on user knowledge of current conditions or historical knowledge. Thus a user can alter the boundary layer parameterization scheme. There's a different choice for that particular combination. And so there's a list of these, all of these combinations that we, you know, have, there's this great big table that says if this is happening, then go pick this particular set of parameterization schemes.

To best assess the existing weather conditions, all of the meteorological parameters need to be seen in context, both spatially and temporally. The Mesonet graphics pre-process places the Mesonet data requested into the formats needed by the Mesonet graphics tools. The Mesonet data is presented in one of two major forms: The first is in the form of standard meteorological diagrams such as meteograms and station models for web based graphics. The second form is standard GoogleEarth™ KMZ files. The Mesonet graphics pre-processor sorts the Mesonet data by date, time and station to create of list Mesonet station data to be plotted. Once the list of stations is created the Mesonet data is written out in an intermediate form that is readable by both standard web-based graphics and GoogleEarth™

Figure 9A:
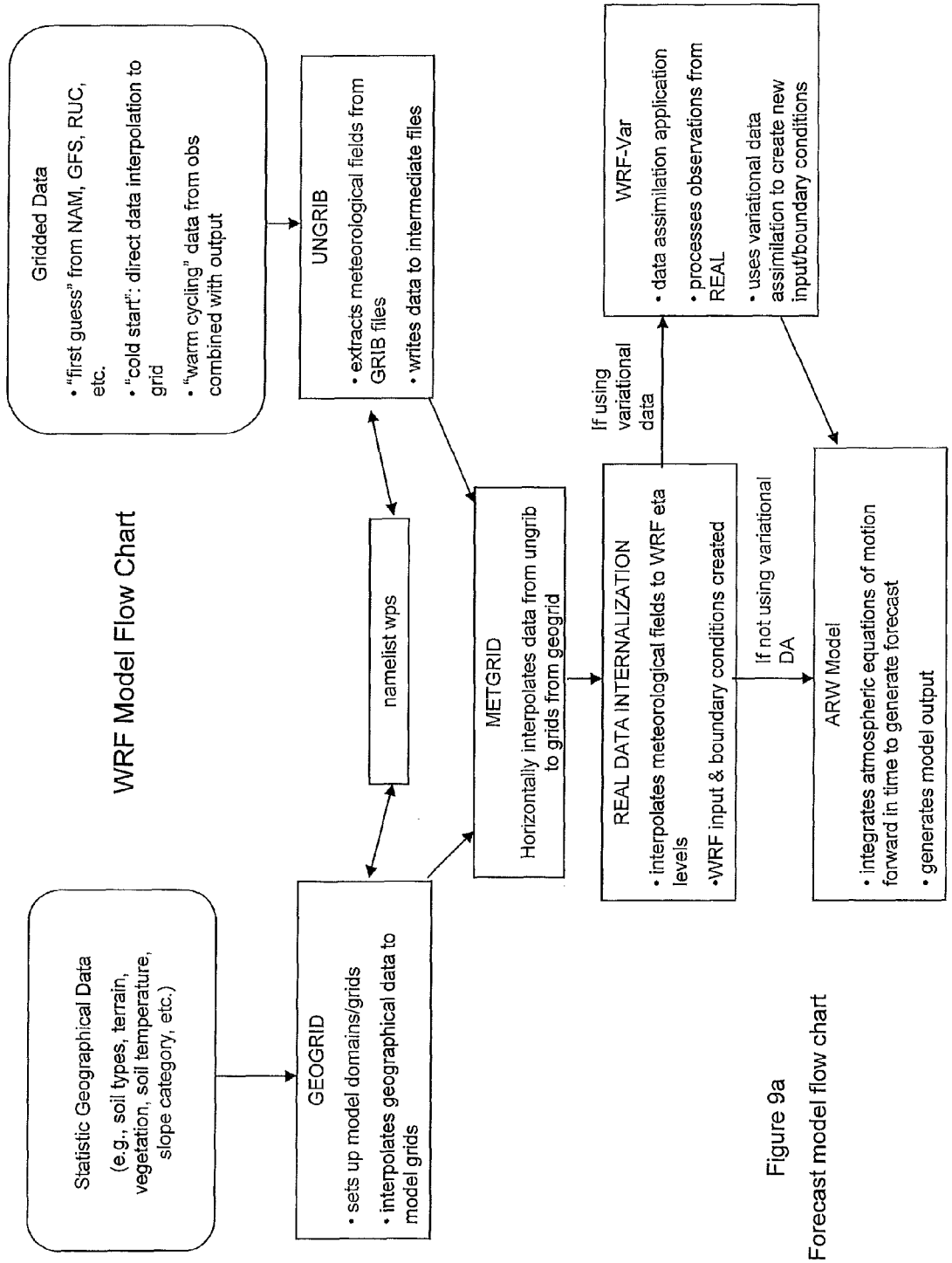
FIG. 9a is a functional flow of the Forecast Model.

Referring to FIG. 9a, a functional flow of the Forecast Model is provided. In order for the Mesoscale meteorological model to create the high spatial and temporal resolution forecasts several independent data sets need to be combined in order to create the lower and lateral boundary conditions for the Mesoscale model. Some of these data sets can be referred to as static data as they change only slowly. An example of a static data set is the topography of the region over which the Mesoscale model is to be run. A second example of a slowly varying but static (for the purposes of the Mesoscale model) data set is the vegetation and land use data. These data are organized by latitude and longitude and available from a number of sources on latitudinal grids that do not match the grid used in the Mesoscale model.

In order to make use of this static data on the grids, the model needs to be a WRF model that allows placement of the static geographic data on a compatible grid of the WRF model by using the geogrid process in order to convert for internal Mesonet model grid values. This creates an intermediate format file that is used by other processes in the Mesoscale model. At the same time the lateral boundary conditions needed by the model to allow for weather systems to pass across the Mesoscale model are provided by the global scale forecasts from the National Weather Service. This data is transmitted in a compressed binary form that needs to be unpacked before it can be used. The WRF model uses the UnGRIB process to unpack the binary formatted data into an intermediate form that can be used with the Mesoscale model. As with the static data the global scale forecast data are not on the same grid as that of the Mesoscale model. To convert the global scale forecast data into the boundary conditions needed by the Mesoscale model, the WRF process MetGRID combines the static geographic data and the global forecast data into a single data set on the grid required by the Mesoscale model. At this point all the data needed by the Mesoscale model is on a consistent grid but is not dynamically and kinematicaly consistent. In order to render this new data set consistent, the WRF process real is executed to insure that all the dynamical and kinematic constraints are enforced. Given the dynamically and kinematically constrained data the Mesoscale model is run to create the high spatial and temporal resolution forecasts needed.

The Mesoscale prediction model that generates high-resolution meteorological fields, which allows for localized Forecast fields, which can be combined with application specific geospatial data on client infrastructure land use and other data. Threat index maps can be generated by application specific combination of meteorological and other data. Mesoscale observation network can be achieved by remotely located sensor suites that can be Commercial of the shelf sensor package with wireless communication and solar charged batteries or a customized suites. A Pre-existing digital broadband communication network, such as a SCADA network, can be leveraged. The system can provide a localized High spatial and temporal resolution customized to a specific application that has Near real-time quality control and ingest of Mesoscale observed data. This data can be utilized in combination with the FOSS Mesoscale prediction model with the FOSS Mesoscale model optimized for best forecast performance.

Figure 9B:
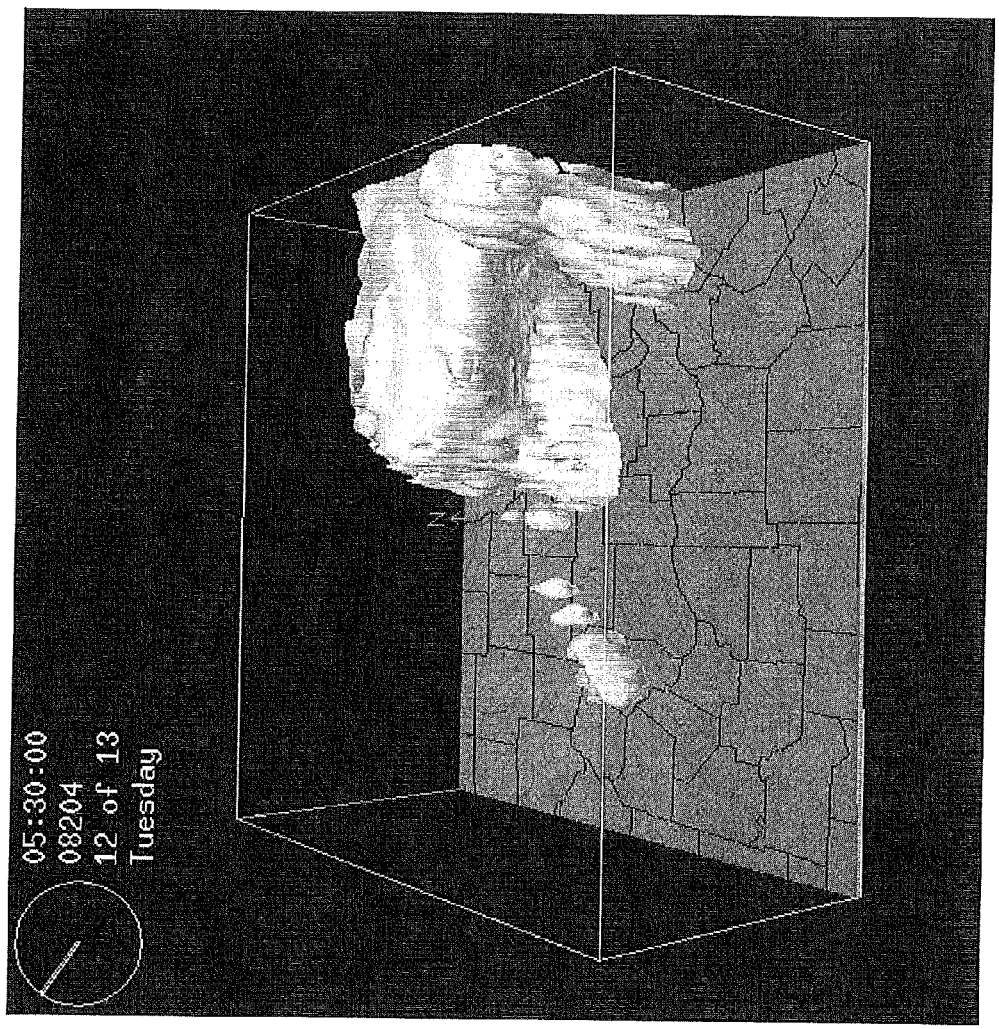
FIG. 9b is an illustration of a three-dimensional rendering of forecast data.

Referring to FIG. 9b, an illustration of a three-dimensional rendering of forecast data is provided.

Figure 9C:
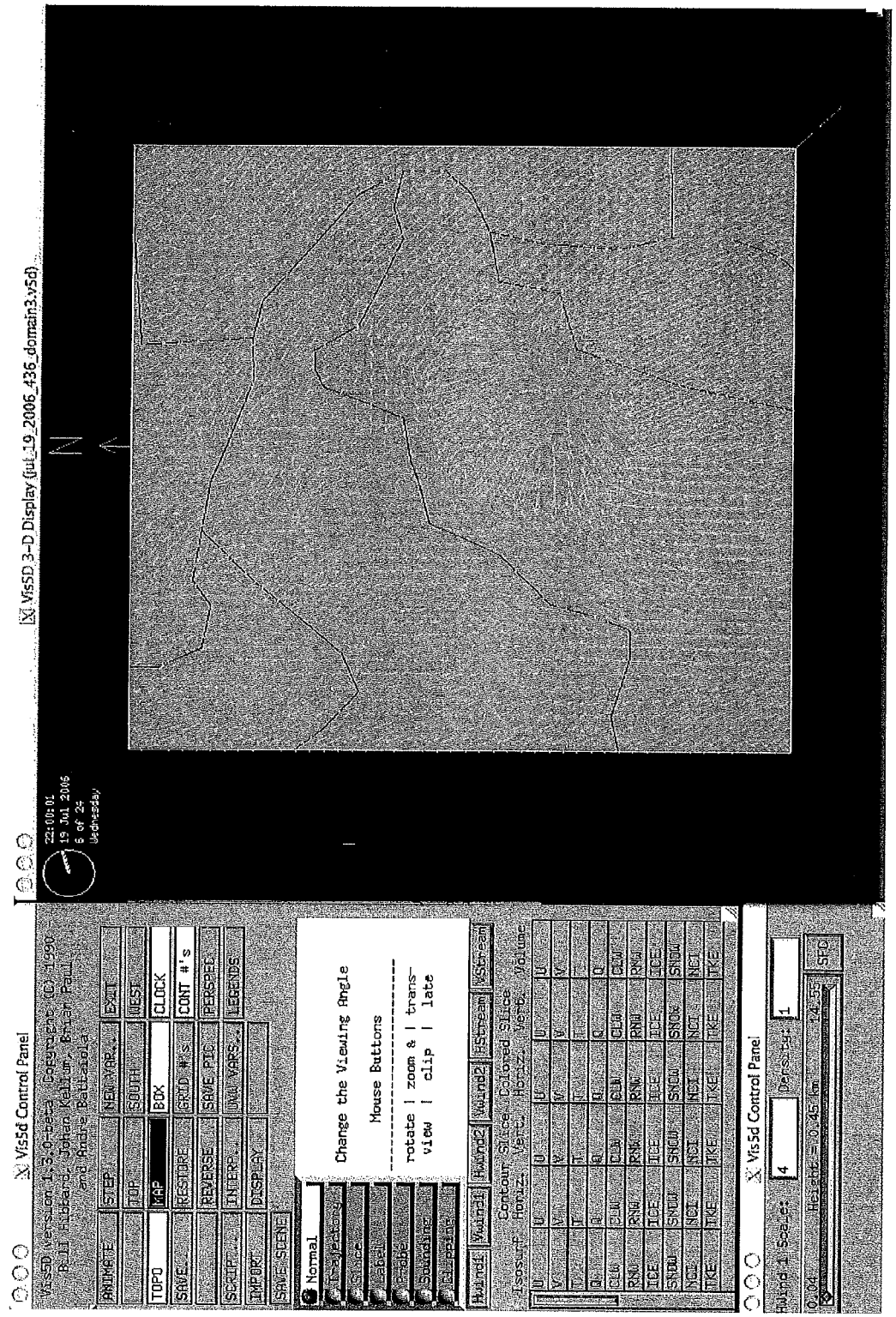
FIG. 9c is an illustration of forecast data.

Referring to FIG. 9c, an illustration of forecast data is provided. In this illustration, wind vectors can be seen, which relate wind direction and intensity across a region. The length, direction and placement of the arrows define the speed and direction of the wind at specific positions. When combined, the wind vectors comprise a wind gradient. Very high wind speeds can be flagged as possible threat.

Figure 9D:
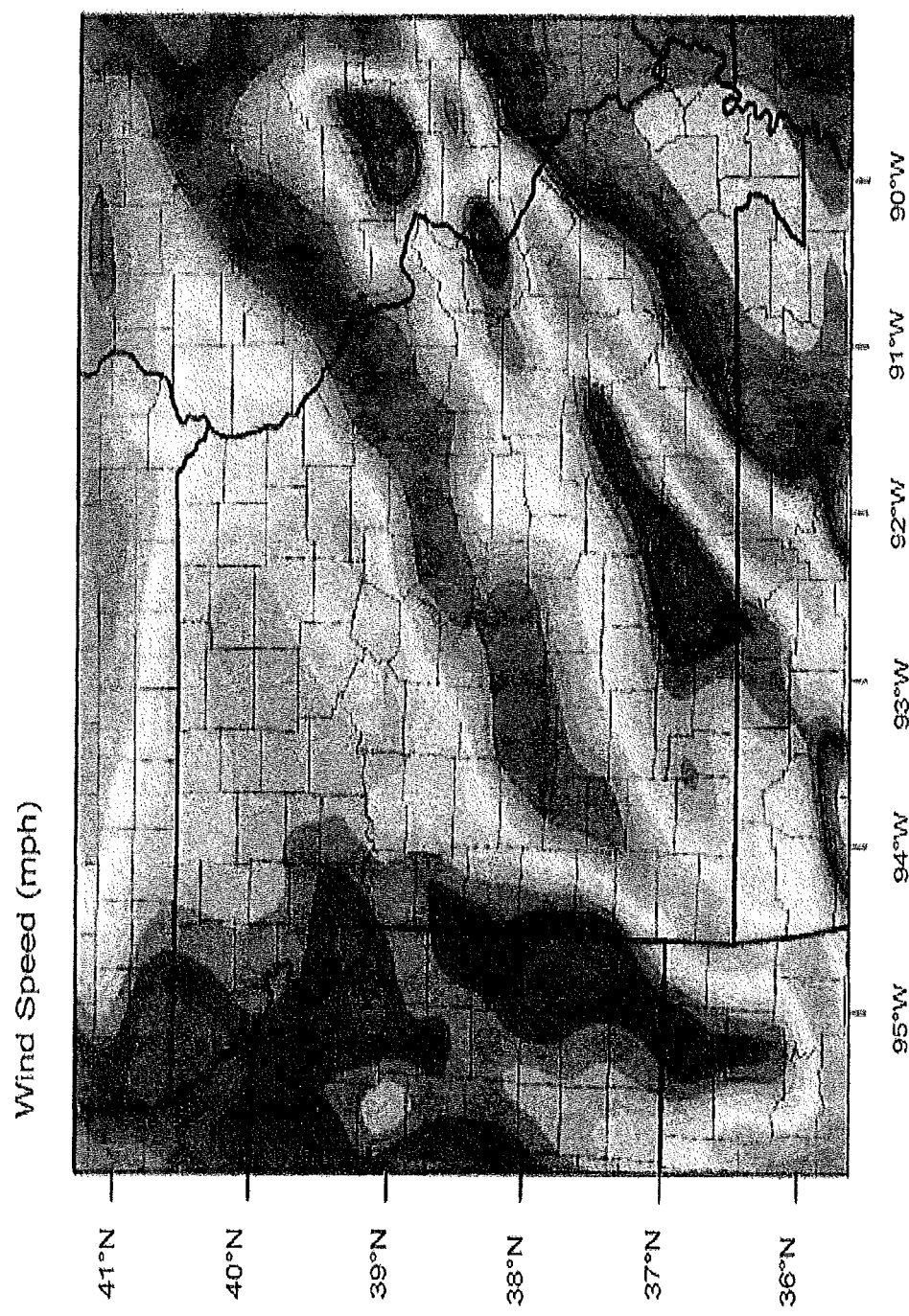
FIG. 9d is an illustration of threat level data; and
While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

Referring to FIG. 9d, an illustration of threat level data is provided. In this illustration, threat levels are shown across the state of Missouri, with the highest threat levels being located in the southeastern corner of the state. Such an output from the EAS system could be analyzed by a forecaster, or be given to the Emergency Response Management of a business or the government for their review. Based on such an illustration, such management could determine how to response to the impending threat.

The EAS process as described above is an automated system with oversight by an experienced weather forecaster who can at their discretion alter the flow of the process via a user interface. This allows the EAS process to more faithfully determine the threat posed by a weather event and to allow the EAS process to handle unexpected events such as a hazardous chemical spill. Every day a new Lead Forecaster can take over at 12UTC. At this point the lead forecaster verifies that the Mesonet data and network are operating normally by monitoring the status provided by the user interface. Further the lead forecaster examines the log files created by the previous lead forecaster for notes on the performance of the system during the previous shift. To further verify the performance of the EAS process, the Mesonet Quality control run logs and model run logs are examined to insure that no unexpected results have been produced. At this point the lead forecaster reaches a decision point for the EAS process.

The data from the National Center for Environmental Prediction has become available and the lead forecaster can make a decision as to which configuration of the Mesoscale model to run. If the lead forecaster does not believe a significant weather event will occur in the next twenty-four hours or if the scale of the significant event can be accurately forecast by a slightly lower resolution, a high spatial and temporal resolution (9 km grid spacing) version of the Mesoscale model is selected via the user interface and run by allowing the EAS process automated software to run to completion. If on the other hand in the opinion of the lead forecaster a significant weather event will occur in the next twenty-four hours a very high spatial and temporal resolution (1 km grid spacing) version of the Mesoscale model can be selected via the user interface and run by restarting the EAS process with a the high resolution flag set. Further the lead forecaster can make the decision as to whether to run multiple realizations of the Mesoscale model utilizing different starting and boundary conditions in order to create the most accurate assessment of the significant weather event. By rerunning the model with varying starting and boundary conditions, the lead forecaster can analyze the variance in the prediction outcomes and determine a confidence level in the assessment of the weather.

In the event the lead forecaster decides that a significant weather event will occur in the next twenty-four hours requiring the very high resolution version of the Mesoscale model to be run, preferably the past two hours of quality controlled data from the Mesonet is combined with the data produced by real process (which may have been run without Mesonet data incorporated) in the standard WRF initialization process via WRF 3D-VAR. More or less Mesonet data may be incorporated, though more data increases run time. WRF 3D-VAR creates a new set of lateral and lower boundary conditions that are markedly improved due to the addition of the two hours of Mesonet data. In addition the lead forecaster may make contact with other forecasters associated with the EAS process for the independent verification of the event.

This contact can be provided via the user interface. Given the additional forecast information, if merited, a warning can be sent to the mail address of those parties that will be affected by the significant weather event. This message can also be transmitted via the user interface. In addition the lead forecasters name and telephone number can be included as part of the email to allow the parties affected by the weather event to pose more detailed questions. As the Mesoscale model creates the numerical weather forecast, the model output is verified against Mesonet data later attained during the forecasted window to insure the Mesoscale model has not failed in some unknown manner. This raises confidence in the results of the Mesoscale model. As the significant weather event unfolds the lead forecaster can contact parties affected, giving updates to the progress of the event, and can provide an assessment of the threat posed by the weather event. The threat index described is computed by combining the relevant factors for the parties affect into the geographically and temporally distributed threat index.

If no significant weather event is predicted to occur with the next twenty four hours the lead forecaster can stand down and the EAS process is allowed to continue function without further intervention.

The various EAS system and process examples shown above illustrate a novel Emergency Management system. A user of the present invention may choose any of the above embodiments, or an equivalent thereof, depending upon the desired application. In this regard, it is recognized that various forms of the subject invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

We claim:

1. A computer system for predicting weather-related threats, comprising:
   a computer system having a memory and one or more processors; and
   one or more processor executable programs stored in the memory and executed by the one or more processors, where the one or more processor executable programs include:
   instructions for combining at a computer larger scale numerical weather forecast data with high spatial and high temporal resolution data from a local Doppler radar system thereby initializing and creating boundary conditions for a forecast model having higher spatial and temporal correlation factors between observed and predicted weather conditions;
   instructions for deriving three dimensional meteorological fields using current observed and predicted meteorological fields including three dimensional wind fields, wind perturbations and temperature perturbations; and
   instructions for providing an inversion technique to compute realistic perturbation pressures and perturbation temperature fields, and error magnitudes in the recovered fields, which can be used to predict wind field changes and wind loading over a time duration.

2. The system as recited in claim 1, where the one or more processor executable programs further include: instructions for assigning a Threat Index value based on a type of an asset, a weather threat for the asset; and local conditions and further adapted to present the Threat Index value in graphical form to a user interface.

3. The system as recited in claim 1, where the one or more processor executable programs further include: instructions for tuning the forecast model to fit local conditions as measured real-time by a local mesonet by selecting parameterization schemes based on the local conditions as measured real-time by the local mesonet and based on the differences between predicted conditions and local conditions as measured.

4. The system as recited in claim 3, where the one or more processor executable programs further include: instructions for presenting a user interface adapted to allow an operator to input modification data to modify results of the forecast model based on historical data, recent trends and conditions known by the operator.

5. The system as recited in claim 4, where the one or more processor executable programs further include: instructions for initializing lateral boundary conditions based on the larger scale numerical weather forecast data and lower boundary conditions based on climatological geographic data for a domain of the forecast model.

6. A computer system for predicting weather-related threats, comprising:
   a computer system having a memory and one or more processors; and
   one or more processor executable programs stored in the memory and executed by the one or more processors, where the one or more processor executable programs include:
   instructions for initializing lateral boundary conditions based on large scale numerical weather forecast data and lower boundary conditions based on climatological geographic data thereby implementing an earth and atmosphere model domain;
   instructions for combining at a computer larger scale numerical weather forecast data with high spatial and high temporal resolution data from a local Doppler radar system thereby initializing and creating boundary conditions for a forecast model having higher spatial and temporal correlation factors between observed and predicted weather conditions;
   instructions for performing downward integration from a top boundary thereby deriving three dimensional meteorological fields using current observed and predicted meteorological fields including three dimensional wind fields, wind perturbations and temperature perturbations; and
   instructions for providing an inversion technique to compute realistic perturbation pressures and perturbation temperature fields, and error magnitudes in recovered fields, which can be used to predict wind field changes and wind loading over a time duration.

7. The system as recited in claim 6, where the one or more processor executable programs further include: instructions for assigning a Threat Index value based on a type of an asset, a weather threat for the asset and local conditions, and further presenting the Threat Index value in graphical form to a user interface.

8. The system as recited in claim 7, where the one or more processor executable programs further include: instructions for monitoring data from a local mesonet and large scale numerical weather forecast data for out of tolerance conditions.

9. The system as recited in claim 8, where the one or more processor executable programs further include: instructions for combining regional topographical, climatological and infrastructure data to create the forecast model.

10. The system as recited in claim 9, where the one or more processor executable programs further include: instructions for deriving meteorological fields using current and predicted meteorological fields including one or more of divergence, vorticity, moisture advection, wind velocity shear, wind velocity deformation, and gradient wind strength, thereby maximizing temporal and spatial resolution.

11. A computer implemented method for providing environmentally predictive indicators and related threats, comprising the steps of:
assembling at a computer system meteorological sensor data from a plurality of Doppler radar monitoring stations communicably linked over a wide area network and placed geographically based on infrastructure data and natural environmental and man-made regional characteristic data and transmitting the meteorological Doppler radar data to a central server having program instructions where when said program instructions are executed are adapted to perform the steps of:
combining at a computer larger scale numerical weather forecast data with high spatial and high temporal resolution data from the plurality of Doppler radar monitoring stations thereby initializing and creating boundary conditions for a forecast model having higher spatial and temporal correlation factors between observed and predicted weather conditions;
initializing lateral boundary conditions based on large scale numerical weather forecast data and lower boundary conditions based on climatological geographic data for an earth and atmosphere model domain; and
combining model domain boundary conditions and the meteorological Doppler radar data transformed into a uniform data grid for implementing a forecasting model.

12. The method as recited in claim 11, where when said program instructions are executed they are further adapted to perform the steps of generating weather prediction data based on the forecasting model and outputting the weather prediction data to a user interface.

13. The method as recited in claim 12, where when said program instructions are executed they are further adapted to perform the steps of assigning a Threat Index value based on a type of an asset, a weather threat for the asset; and local conditions and further presenting the Threat Index value in graphical form to the user interface.

14. The method as recited in claim 13, where the user interface has an input device adapted to allow the operator to input modification data and further comprising the step of modifying results based on historical data, recent trends and conditions known by the operator.

15. The method as recited in claim 14, wherein the climatological geographic data further includes land topology.

16. The method as recited in claim 15, wherein the infrastructure data further includes population density data, where said Threat Index value indicates the probability that winds will spread a harmful agent toward a location with a high population density.

17. The method as recited in claim 16, wherein the infrastructure data includes flammable substance location data, and where said Threat Index value indicates the probability that winds will spread a fire toward a location which may contain the flammable substance.

18. The method as recited in claim 17, wherein each of the plurality of Doppler radar monitoring stations are spaced apart less than 200 miles, one with respect to the other.

19. The method as recited in claim 18, further comprising the step of monitoring with a Quality Control module of the computing system data from Local Mesonet stations and National Weather Service and detecting out of tolerance conditions.

20. The method as recited in claim 19, where one or more of each of the plurality of the Doppler radar monitoring stations measure one or more of weather conditions including temperature, humidity, atmospheric pressure, wind speed and precipitation rate.

21. A computer implemented method, comprising the steps of:
deriving unknown model parameters from observations distributed in space and time;
inserting Doppler radar observations into a numerical model and determining the state of the numerical model;
inserting a wind radial velocity, adjusting two other wind components with respect to a continuity equation and some mean quantities;
retrieving pressure and temperature perturbations;
refining quality control, editing and analysis techniques thereby providing a more accurate three dimensional wind field recovered from the observed radial velocities and radar reflectivities;
combining regional topographical, climatological and infrastructure data to create a forecast model; and
tuning the forecast model to fit local conditions as measured real-time by a local mesonet by selecting parameterization schemes based on local conditions as measured real-time by the local mesonet and the differences between predicted conditions and local conditions as measured.

22. The computer implemented method as recited in claim 21, further comprising the steps of: initializing lateral boundary conditions based on a larger scale numerical weather forecast data and lower boundary conditions based on climatological geographic data for a domain of the forecast model.

23. A computer implemented method, comprising the steps of:
receiving at a computer system meteorological sensor data from a plurality of Doppler radar stations communicably linked over a wide area network and placed geographically based on infrastructure data and natural environmental and man-made regional characteristic data to a central server having program instructions where when said program instructions are executed perform the steps of:
initializing lateral boundary conditions based on large scale numerical weather forecast data and lower boundary conditions based on climatological geographic data for an earth and atmosphere model domain;
inserting a wind radial velocity from the meteorological sensor data, adjusting two other wind components with respect to a continuity equation and some mean quantities;
retrieving pressure and temperature perturbations; and
refining quality control, editing and analysis techniques thereby providing a more accurate three dimensional wind field recovered from observed radial velocities and radar reflectivities.

24. The method as recited in claim 23, where when said program instructions are executed they further perform the steps of generating weather prediction data based on a forecasting model and outputting the weather prediction data to a user interface.

25. The method as recited in claim 24, where when said program instructions are executed they further perform the steps of assigning a Threat Index value based on a type of an asset, a weather threat for the asset; and local conditions and further presenting the Threat Index value in graphical form to the user interface.

26. The method as recited in claim 25, wherein the climatological geographic data further includes land topology.

27. A computer implemented method, comprising the steps of:
  initializing at a computer lateral boundary conditions based on large scale numerical weather forecast data and lower boundary conditions based on climatological geographic data thereby implementing an earth and atmosphere model domain;
  transforming into a uniform data grid sensor data from a local mesonet having a plurality of Doppler radar monitoring stations communicably linked over a wide area network and placed geographically based on infrastructure data and natural environmental and man-made regional characteristic data;
  combining the earth and atmosphere model domain boundary conditions and the sensor data collected from the local mesonet thereby implementing a forecasting model;
  inserting a wind radial velocity from the sensor data, and adjusting two other wind components with respect to the continuity equation and some mean quantities;
  retrieving pressure and temperature perturbations; and
  refining quality control, editing and analysis techniques thereby providing a more accurate three dimensional wind field recovered from observed radial velocities and radar reflectivities.

28. The computer implemented method as recited in claim 27, further comprising the step of: assigning a Threat Index value based on a type of an asset, a weather threat for the asset; and local conditions and further presenting the Threat Index value in graphical form to a user interface.

* * * * *